US011710102B2

(12) United States Patent
DeLand et al.

(10) Patent No.: US 11,710,102 B2
(45) Date of Patent: Jul. 25, 2023

(54) FORMING EVENT-BASED RECOMMENDATIONS

(71) Applicant: Box, Inc., Redwood City, CA (US)

(72) Inventors: Matthew DeLand, San Francisco, CA (US); Victor De Vansa Vikramaratne, Mountain View, CA (US)

(73) Assignee: Box, Inc., Redwood City, CA (US)

(*) Notice: Subject to any disclaimer, the term of this patent is extended or adjusted under 35 U.S.C. 154(b) by 329 days.

(21) Appl. No.: 16/051,442

(22) Filed: Jul. 31, 2018

(65) Prior Publication Data

US 2019/0034885 A1 Jan. 31, 2019

Related U.S. Application Data

(60) Provisional application No. 62/539,341, filed on Jul. 31, 2017.

(51) Int. Cl.
*G06Q 10/00* (2023.01)
*G06Q 10/1093* (2023.01)
(Continued)

(52) U.S. Cl.
CPC ....... *G06Q 10/1093* (2013.01); *G06F 16/437* (2019.01); *G06F 16/489* (2019.01); *G06Q 10/02* (2013.01)

(58) Field of Classification Search
CPC combination set(s) only.
See application file for complete search history.

(56) References Cited

U.S. PATENT DOCUMENTS

| 7,219,307 B2* | 5/2007 | Senay | G06Q 10/10 715/764 |
| 9,325,751 B2* | 4/2016 | Bosworth | G06Q 50/01 |

(Continued)

OTHER PUBLICATIONS

L. Xiaojun, "An improved clustering-based collaborative filtering recommendation algorithm," Cluster Computing, vol. 20, No. 2, pp. 1281-1288, (Year: 2017).*

(Continued)

*Primary Examiner* — Rutao Wu
*Assistant Examiner* — Scott M Ross
(74) *Attorney, Agent, or Firm* — Vista IP Law Group, LLP

(57) ABSTRACT

Systems and methods for forming collaboration recommendations. Techniques for forming event-based recommendations use time-decayed event values. A shared content management system supports a plurality of users that generate events by interacting with content objects of the shared content management system. Events over the content objects are captured as event objects. Method steps are invoked upon receiving event objects that describes user-to-object interaction events that arise from interactions by users over content objects. Different types of interactions carry different importance values. The importance values can be applied as weights when scoring user-to-object interaction activities. The importance can decay over time. As time progresses and as the importance of older interactions decay, score components of a user-to-object interaction can be updated based at least in part on a time decay function. The system emits collaboration recommendations based on the decayed user-to-user collaboration scores.

20 Claims, 18 Drawing Sheets

(51) Int. Cl.
 *G06Q 10/02* (2012.01)
 *G06F 16/435* (2019.01)
 *G06F 16/48* (2019.01)

(56) References Cited

U.S. PATENT DOCUMENTS

| | | | |
|---|---|---|---|
| 10,581,954 B2* | 3/2020 | Narayan | H04L 67/10 |
| 2002/0196939 A1* | 12/2002 | Unger | H04N 21/4344 |
| | | | 380/216 |
| 2007/0157270 A1* | 7/2007 | Lee | H04N 21/4332 |
| | | | 725/100 |
| 2011/0264736 A1* | 10/2011 | Zuckerberg | G06F 16/972 |
| | | | 709/204 |
| 2012/0284090 A1* | 11/2012 | Marins | G06Q 10/0631 |
| | | | 705/7.39 |
| 2012/0316960 A1* | 12/2012 | Yang | G06Q 30/0282 |
| | | | 705/14.53 |
| 2014/0237037 A1* | 8/2014 | Waingold | G06Q 50/01 |
| | | | 709/204 |
| 2015/0073875 A1* | 3/2015 | Rahman | G06Q 50/01 |
| | | | 705/7.39 |
| 2016/0205207 A1* | 7/2016 | Backstrom | G06F 17/30867 |
| | | | 709/224 |
| 2016/0292405 A1* | 10/2016 | Thomas | G06F 16/24575 |
| 2016/0379270 A1* | 12/2016 | Shah | G06Q 30/0277 |
| | | | 705/14.66 |
| 2018/0018327 A1* | 1/2018 | Fleischman | G06F 16/40 |
| 2018/0139249 A1* | 5/2018 | Borenstein | G06F 16/22 |
| 2018/0139294 A1* | 5/2018 | Ju | G06Q 50/01 |
| 2019/0108271 A1 | 4/2019 | Vikramaratne | |

OTHER PUBLICATIONS

How to Efficiently Decode and Play Audio Files in Embedded Systems, Digi-Key Electronics, By Jacob Beningo, Nov. 5, 2019, (Year: 2019).*

* cited by examiner

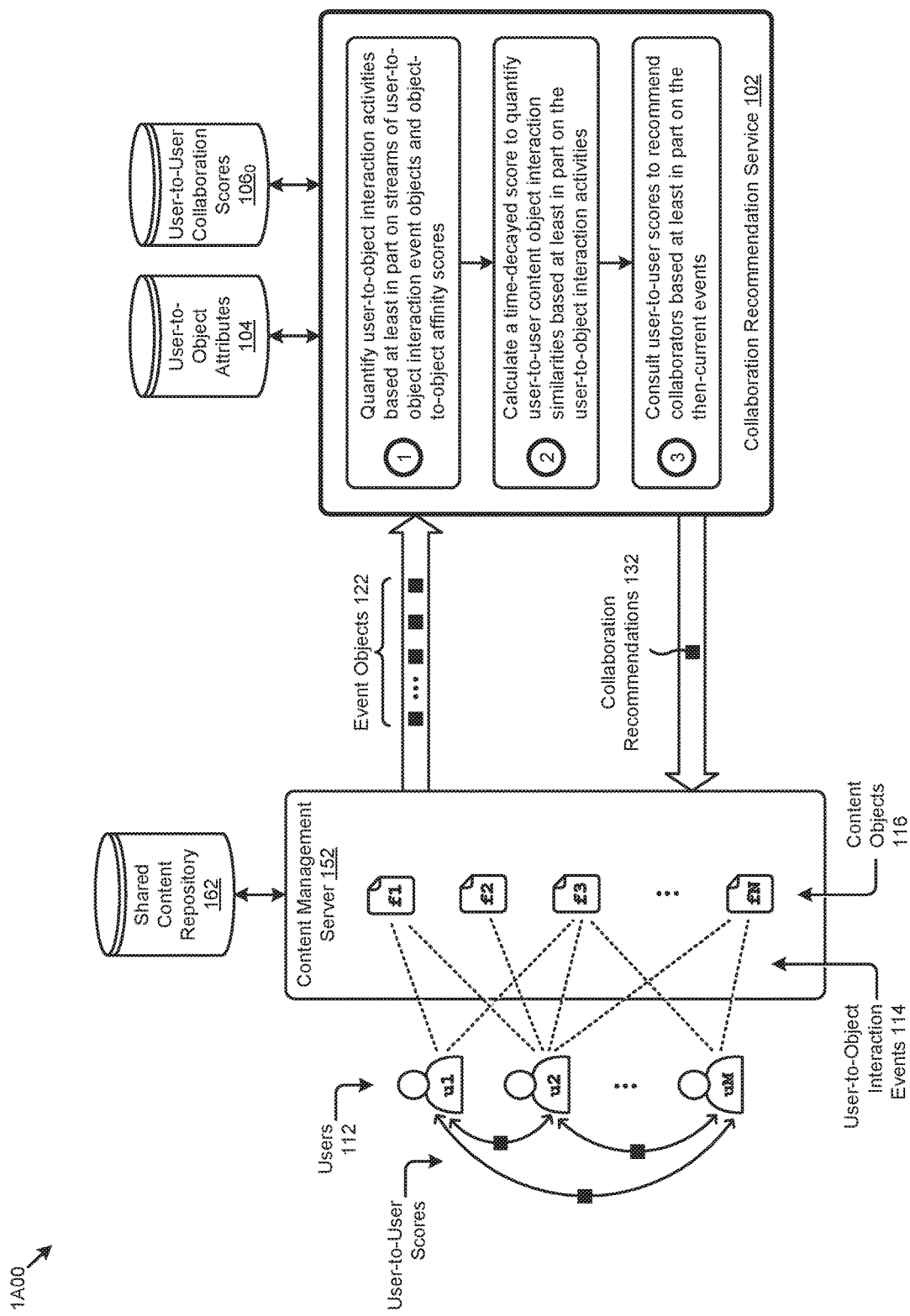
FIG. 1A1

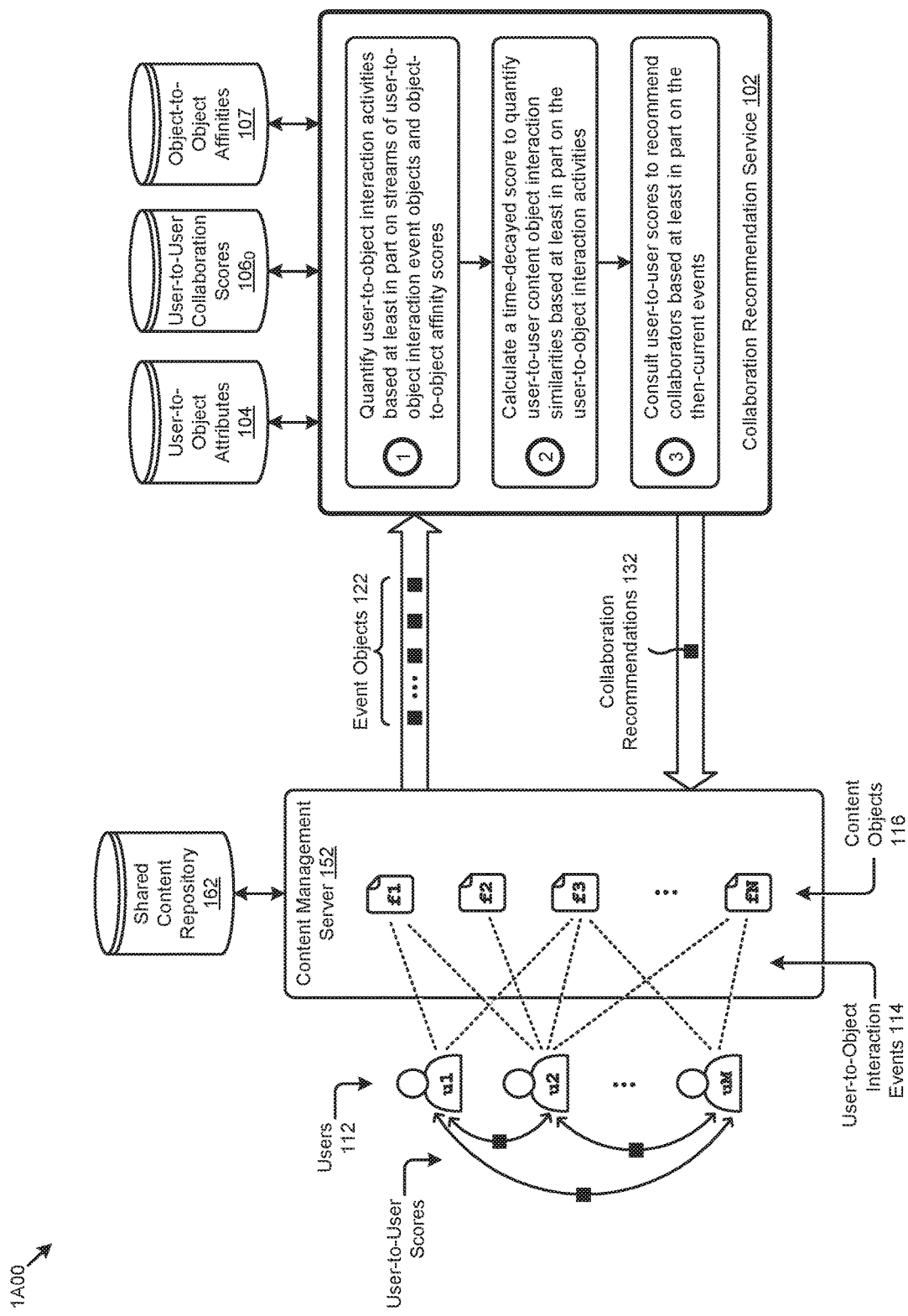
FIG. 1A2

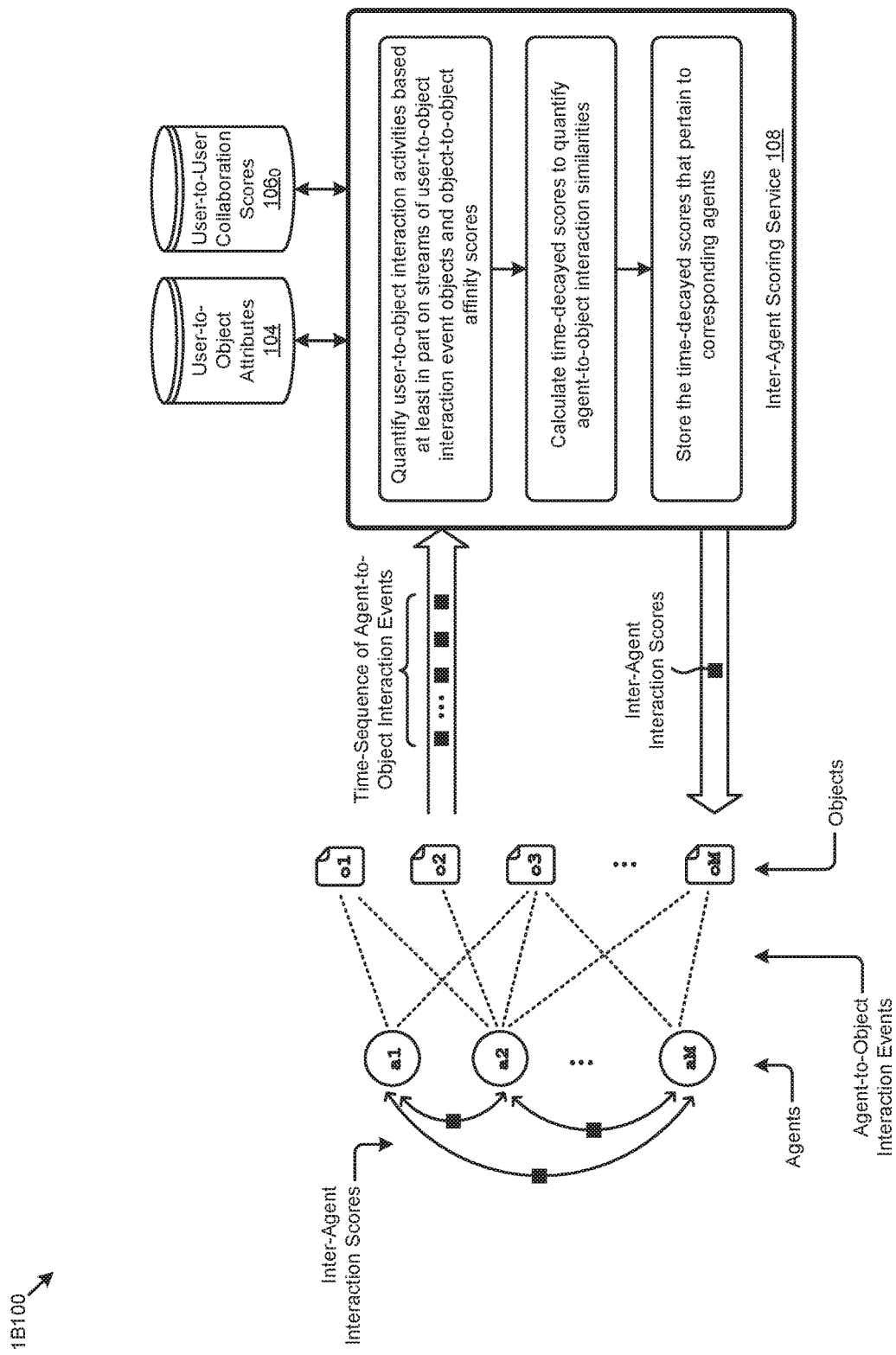
FIG. 1B1

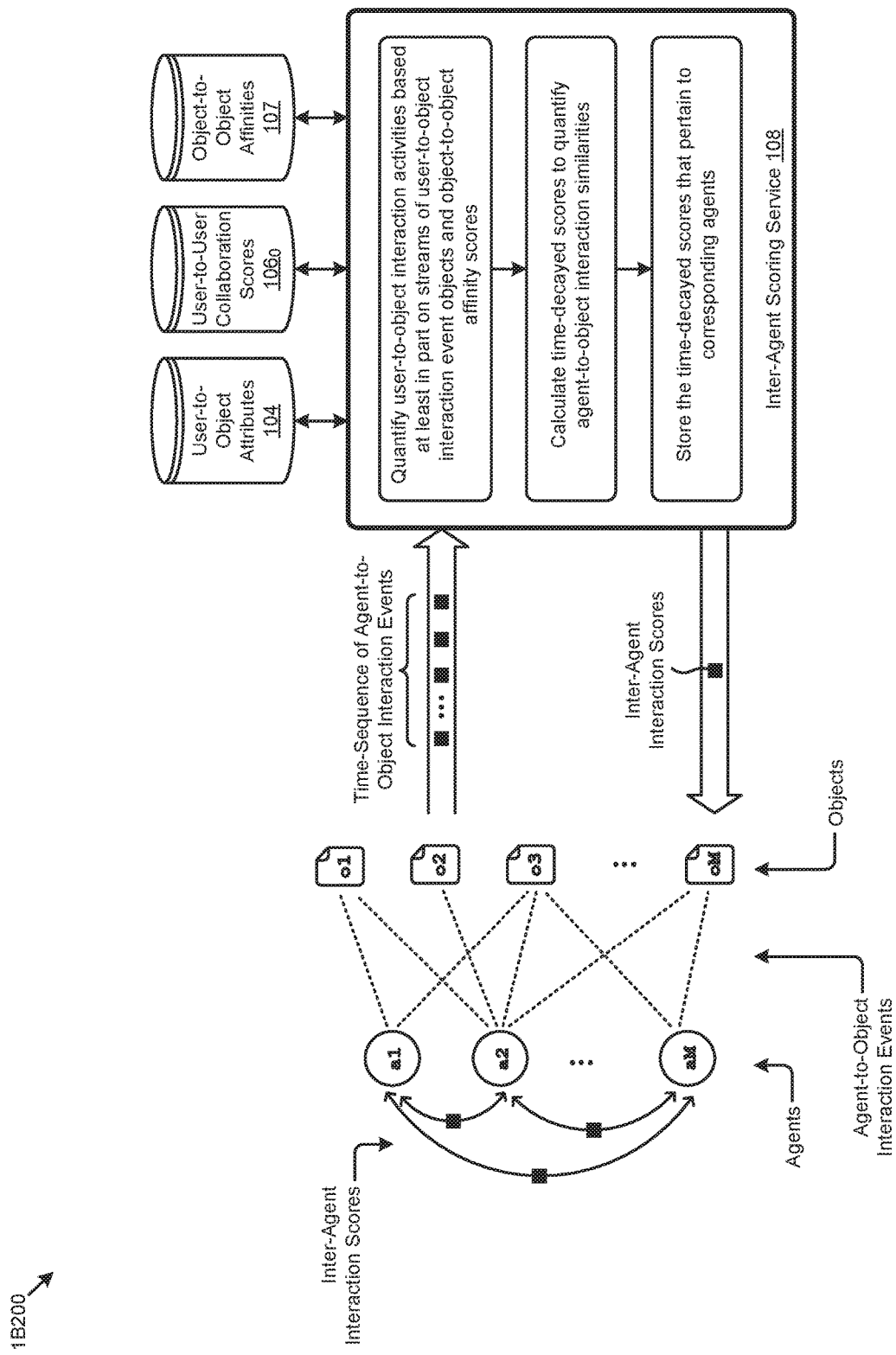
FIG. 1B2

FORMING EVENT-BASED RECOMMENDATIONS

RELATED APPLICATIONS

The present application claims the benefit of priority to U.S. Patent Application Ser. No. 62/539,341 titled "FORMING EVENT-BASED RECOMMENDATIONS", filed Jul. 31, 2017, which is hereby incorporated by reference in its entirety.

FIELD

This disclosure relates to techniques for identifying and maintaining time-decayed scores of interactions between similar agents and objects, and more particularly to techniques for forming and maintaining data structures that facilitate event-based recommendations in a collaboration system.

BACKGROUND

Modern enterprises encourage collaboration to boost efficiency, productivity, and creativity. Such collaboration often involves interactions (e.g., authoring, commenting, sharing, etc.) by the collaborators over computer-readable content objects (e.g., text files, spreadsheets, mixed text and graphics documents, programming code files, etc.). In some cases, the collaborators associated with the content objects might know one another and even be collocated at the same physical location. However, modern distributed computing and storage platforms (e.g., cloud-based content management platforms) have evolved to the extent that secure sharing of large volumes of content among geographically dispersed collaborators is accommodated by networks of geographically-dispersed computers. For example, an enterprise (e.g., that deploys distributed computing and storage platforms) having thousands of employees (e.g., users of the computing and storage platforms) and many terabytes of content might use a cloud-based content management platform to efficiently and securely facilitate content access to the client devices (e.g., computers) used by various individual users and/or groups of collaborating users. The constituency of the user groups is often very dynamic (e.g., employees come and go, change roles, etc.) as is the content itself (e.g., content objects are frequently added, deleted, edited, reorganized, etc.). Further, the users, content objects, and content owners managed by the distributed computing and storage platforms continue to expand over time to ever larger and larger numbers.

Unfortunately, any given user that interfaces with such highly-dynamic shared content environments might have difficulty knowing the constituency of his or her collaborators-in-fact. As an example, a user "u1" in San Francisco who is interacting with a section of a file "f1" might not know that he or she should collaborate with a newly hired user "u2" in Seoul who just accessed the same section of file "f1". Legacy approaches fail in many regards. In particular, legacy approaches are "slow" and wastefully consume significant computing, storage, and networking resources. For example, slow legacy techniques introduce unnecessary delays between the time that some user-to-object event has occurred and the time that the collaboration candidates are identified.

Worse, legacy techniques fail to timely identify collaboration opportunities that are time-wise relevant. For example, the foregoing approach might identify user "u2" as a collaboration candidate for user "u1" based at least in part on historical user-to-object interactions. However, if it had transpired that, user "u1" had moved on to work on another project (and a corresponding set of content objects) in another role, this might render the delayed collaboration suggestion pertaining to user "u1" and user "u2" as no longer relevant.

What is needed is a technique or techniques to identify collaboration candidates that are quantitatively determined to be relevant with respect to a then-current series of recently observed interaction events. More specifically, what is needed is a technological solution that identifies time-wise relevant collaborators so as to emit collaboration candidate suggestions that are relevant at or near the time that a user-to-object event occurs.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by the occurrence of their inclusion in this section.

SUMMARY

The present disclosure describes techniques used in systems, methods, and in computer program products for event-based recommendations, which techniques advance the relevant technologies to address technological issues with legacy approaches. More specifically, the present disclosure describes techniques used in systems, methods, and in computer program products for issuing event-based recommendations. Certain embodiments are directed to technological solutions for incrementally updating components of user-to-user collaboration scores responsive to the then-current user-to-object interaction events to facilitate emission of real-time collaboration recommendations.

The disclosed embodiments modify and improve over legacy approaches. In particular, the herein-disclosed techniques provide technical solutions that address the technical problems attendant to efficiently identifying collaboration candidates that are quantitatively determined to be relevant with respect to a series of user-to-object interaction events. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Embodiments include techniques that avoid storing log data over long periods of time. The disclosed techniques show that a value that incorporates all time-decayed values from all past events can be calculated without having to collect and recollect all such past events. Rather, the embodiments herein store a new time-decayed value each time there is a new event pertaining to a particular entity. The improvements that accrue to the herein-disclosed techniques include dramatically reduced usage of persistent storage, dramatically reduced usage of computing CPU power, and dramatically reduced usage of computer memory since dramatically fewer past events need to be stored, collected, recollected and recalculated.

Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of collaboration systems as well as advances in various technical fields related to distributed computing.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 1A1 and FIG. 1A2 are diagrams that depicts several implementation techniques as used in systems that emit collaboration recommendations based at least in part on then-current events over shared content, according to an embodiment.

FIG. 1B1 and FIG. 1B2 are diagrams that depicts several implementation techniques as used in systems that score interactions based on a time-series of events, according to an embodiment.

FIG. 2 depicts a diagram that shows several event-based collaboration recommendation techniques as implemented in systems that facilitate forming collaboration recommendations based at least in part on the then-current events over shared content, according to an embodiment.

DETAILED DESCRIPTION

Figure 1C:
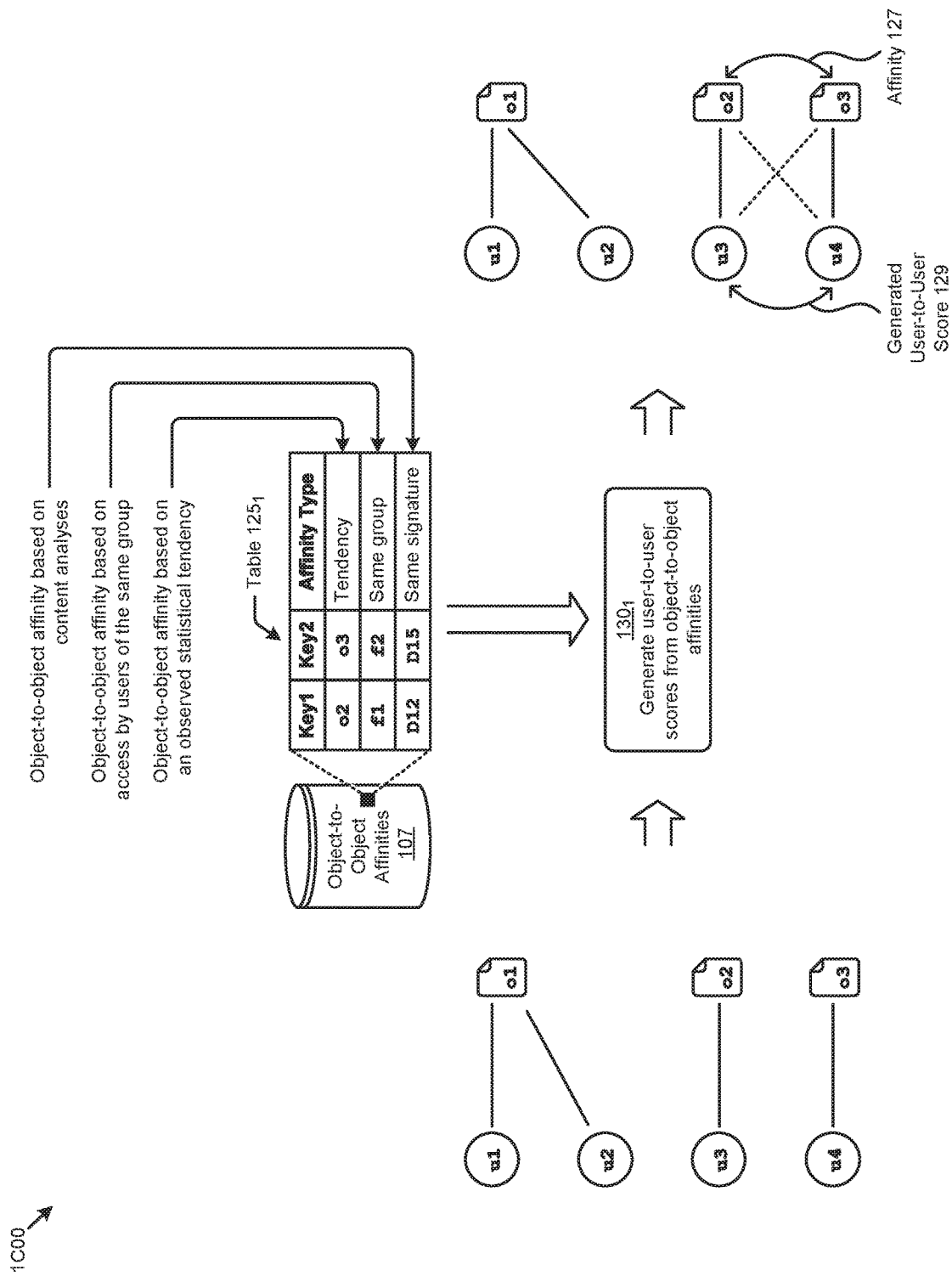
FIG. 1C is a diagram that depicts a technique for formation of user-to-user relationships based on object-to-object affinities, according to an embodiment.

Embodiments in accordance with the present disclosure address the problem of efficiently identifying collaboration candidates that are quantitatively determined to be relevant with respect to a series of then-current user-to-object interaction events. Some embodiments are directed to approaches for incrementally updating components of user-to-user collaboration scores responsive to the then-current user-to-object interaction events to facilitate real-time collaboration recommendations. The accompanying figures and discussions herein present example environments, systems, methods, and computer program products for emitting collaboration recommendations.

Overview

Disclosed herein are techniques for maintaining and incrementally updating certain sets of user-to-user collaboration scores in response to the then-current user-to-object interaction events. Implementation of such techniques facilitate emitting collaboration recommendations at the time users are interacting with one or more content objects that pertain to the collaboration recommendations. In certain embodiments, a stream of event objects describing certain user-to-object interaction events (e.g., content object preview, edit, delete, etc.) between a set of users and a set of content objects is received and processed. In doing so, a set of user-to-object attributes that quantify the user-to-object interaction activities are updated. For example, in some embodiments, a vector comprising user-to-object interaction scores for the content objects accessed by a particular user, and the magnitude (e.g., length) of that vector, might be updated at a particular moment in time as a response to a user-to-object interaction event associated with that particular user and a corresponding particular content object. As interaction events occur, at least some of the updates to the user-to-object attributes can invoke recalculation of user-to-user collaboration scores, which in turn are used to identify and emit collaboration recommendations.

The user-to-user collaboration scores are a quantitative indication of the content object interaction similarities between users. The user-to-user collaboration scores are efficiently updated by incrementally updating merely the portion or portions of the score components that are affected by a particular user-to-object attribute update and associated user-to-object interaction event. The updated score components are then used to update the pertinent user-to-user collaboration scores. At any moment in time, a set of then-current user-to-user collaboration scores are consulted to identify collaboration recommendations to issue to various users. In certain embodiments, a user-to-object interaction score for a particular user and a particular content object comprises a sum of time-decayed interaction weights derived from a time sequence of interactions by the particular user with the particular content object. In certain embodiments, the user-to-user collaboration score is derived from a similarity calculation. In some embodiments, the similarity calculation includes a cosine-similarity calculation having score components that correspond to vector dot-products and vector magnitudes (e.g., lengths). In certain embodiments, a set of processing rules is consulted to determine when to update the user-to-object attributes, the score components, and/or the user-to-user collaboration scores. In certain embodiments, a group of event objects (e.g., for a particular user) can be collected and batch processed.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A1 is a diagram that depicts several implementation techniques 1A00 as used in systems that emit collaboration recommendations based at least in part on the then-current events over shared content. As an option, one or more variations of implementation techniques 1A00 or any aspect thereof may be implemented in the context of the architecture and functionality of the embodiments described herein. The implementation techniques 1A00 or any aspect thereof may be implemented in any environment.

The diagram shown in FIG. 1A1 is merely one example representation of the herein disclosed techniques that facilitate real-time collaboration recommendations based at least in part on the then-current events over shared content. As shown, a set of users 112 (e.g., user "u1", user "u2", . . . , user "uM") interact with a set of content objects 116 (e.g., file "f1", file "f2", file "f3", . . . , file "fN"). The content objects 116 can be any content object (e.g., file, folder, document, image, video, etc.) from a shared content repository 162. In certain embodiments, access to and/or interaction with content objects 116 can be facilitated by a content management server 152.

As earlier mentioned, in modern distributed computing and storage platforms (e.g., cloud-based content management platforms), the makeup of users 112 is often very dynamic (e.g., employees come and go, change roles, etc.) as is the makeup of content objects 116 in a shared content repository 162 (e.g., content objects are frequently added, deleted, edited, reorganized, etc.). Further, the volume of users 112, content objects 116, and content owners managed by such distributed computing and storage platforms can be dynamically added over time to ever larger and larger numbers and/or can dynamically decrease over time as users are removed and/or content is deprecated. In many cases, any given user in such dynamically shared content environments might have difficulty knowing the makeup of his or her then-current collaborators-in-fact. As an example, user "u1", who is interacting with a section of a file "f3", might not know that he or she should collaborate with a newly hired user "uM" who just accessed the same section of file "f3".

Some approaches to identifying potential collaborators might record a log of user-to-object interactions that is analyzed at certain moments in time to discover collaboration candidates. Such approaches can be improved in many regards. Specifically, storing and processing the user-to-object interaction log can consume a significant amount of computing, storage, and networking resources that can introduce delays. Approaches as disclosed hereunder serve to reduce or eliminate delays between the time that some user-to-object interaction event has occurred and the time that the collaboration recommendations are identified. Moreover, implementation of the disclosed approaches serve to dramatically reduce usage of persistent storage, dramatically reduce usage of computing CPU power, and dramatically reduce usage of computer memory since dramatically fewer user-to-object interaction log entries need to be stored and processed.

As illustrated, the herein disclosed techniques provide real-time maintenance of certain sets of user-to-user collaboration scores $106_O$ in response to the then-current user-to-object interaction events 114. Implementation of real-time processing, including incremental update techniques, facilitate emitting collaboration recommendations in real time (e.g., at the same time users are interacting with the content objects).

In certain embodiments, a stream of event objects 122 describing certain user-to-object interaction events 114 (e.g., content object preview, edit, delete, etc.) between users 112 and content objects 116 is received and processed at a collaboration recommendation service 102. In doing so, the user-to-object interaction activities pertaining to user-to-object interaction events 114 are quantified (at operation 1) to codify a set of user-to-object attributes 104. In some situations, the stream of event objects 122 comprises user-to-user interaction events (e.g., add a user to a collaboration group of other users, remove a user from a collaboration group, etc.). Such user-to-user interactions are codified in the event objects 122. Both user-to-user events and user-to-object events are received and processed by the collaboration recommendation service.

Figure 2:
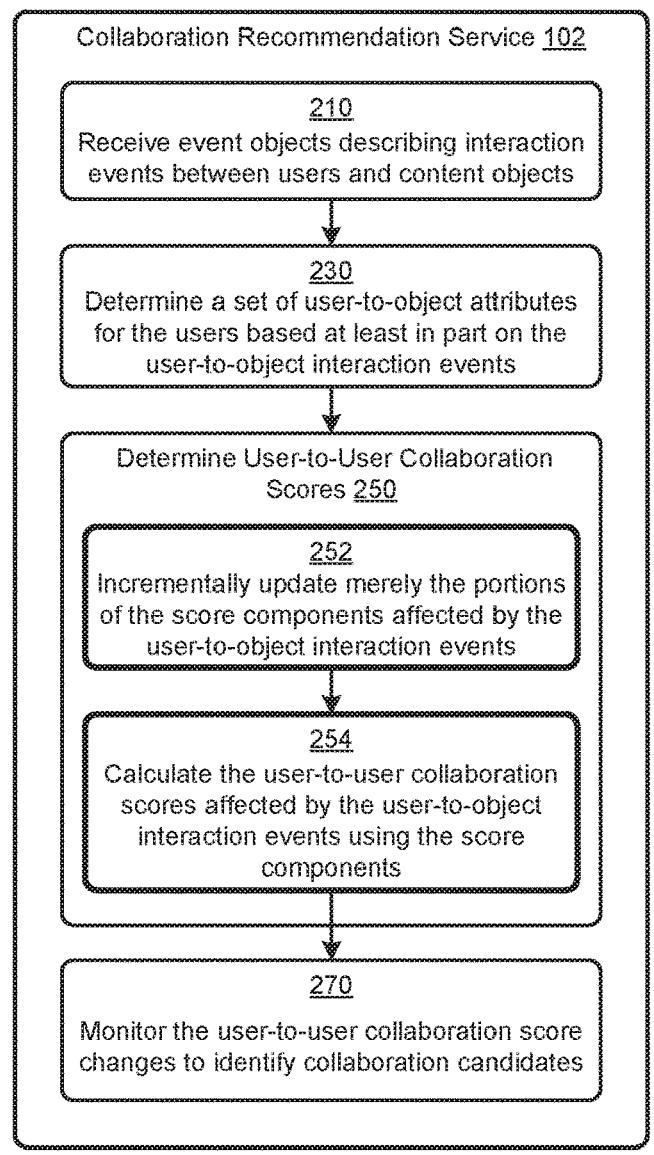

FIG. 1A2 is a diagram that depicts several implementation techniques 1A00 as used in systems that emit collaboration recommendations based at least in part on the then-current events over shared content. As an option, one or more variations of implementation techniques 1A00 or any aspect thereof may be implemented in the context of the architecture and functionality of the embodiments described herein. The implementation techniques 1A00 or any aspect thereof may be implemented in any environment.

In certain embodiments, a stream of event objects 122 describing certain user-to-object interaction events 114 (e.g., content object preview, edit, delete, etc.) between users 112 and content objects 116 is received and processed at a collaboration recommendation service 102. Such user-to-user interactions are codified in the event objects 122. As earlier described, both user-to-user events and user-to-object events are received and processed by the collaboration recommendation service. Additionally, the collaboration recommendation service can process certain types of object-to-object affinities 107. As such the collaboration recommendation service can form recommendations that derive, in whole or in part from object-to-object affinities. Moreover, the object-to-object affinities 107, in combination with user-to-object attributes and user-to-user collaboration scores can be used to form collaboration recommendations that include objects. In some cases, the object themselves form a part of a recommendation. In other cases, the objects that are used to form an object-to-object affinity 107 are used to form relationships between objects and users, even when no corresponding user-to-object event was present in the stream of event objects. Strictly as one example, an object-to-object affinity can be formed on the basis of a commonality of the two objects, even if no two or more users ever interacted with the object. This can happen, for example when a first user creates a new version of a file. In the situation where the earlier version of the file has been accessed by a second user, but that second user has not yet accessed the newer version created by the first user, an object-to-object affinity might nevertheless be generated so as to indicate an object-to-object tendency that derives from an observation that a given user who accesses an earlier version of a file has a tendency to access a later version as well. As such, a new relationship between the first user and the second user can be established even before the second user accesses the later version. Moreover, as heretofore mentioned, such object-to-object affinities can be used in forming any types of recommendations.

Further details pertaining to processing of events and affinities for forming collaboration recommendation are shown and described as pertains to FIG. 1B1, FIG. 1B2, FIG. 1C, and FIG. 1D.

Changes to the quantified user-to-object interaction activities codified in user-to-object attributes 104 invoke further processing that serves to update user-to-user collaboration scores $106_O$ that quantitatively characterize content object interaction similarities between users (operation 2). The updated user-to-user collaboration scores are consulted to recommend collaborators responsive to the then-current received user-to-object interaction events (operation 3). As can be observed, such collaboration recommendations 132 (e.g., a recommended user or users or a recommended object or objects) can be issued from collaboration recommendation service 102 to content management server 152. The content management server 152 can format and otherwise prepare the collaboration recommendations for viewing by users 112.

In comparison to the earlier mentioned legacy approaches, the herein disclosed techniques serve to reduce the demand for computing, storage, and networking resources by efficiently determining (e.g., calculating, updating, etc.) user-to-object attributes 104 and/or user-to-user collaboration scores $106_O$. For example, in certain embodiments, the user-to-user collaboration scores are efficiently updated by incrementally updating merely the time-affected score component representations that pertain to a particular user-to-object representation that is associated with its corresponding interaction event. Further, since the collaboration recommendations 132 are emitted responsive to receiving one or more event objects 122 associated with the then-current user-to-object interaction events, any delay between the time that some user-to-object interaction event 114 has occurred and the time that the collaboration recommendations 132 are identified is minimized so as to provide real-time collaboration recommendations. Further, the herein disclosed techniques implement specialized data structures that improve the way that the computer stores and retrieves data in memory and/or improve the way data is manipulated when performing computerized operations pertaining to such techniques. Certain embodiments of these specialized data structures are described in more detail herein.

Several event-based recommendation techniques that can be implemented according to the herein disclosed techniques are shown and described infra. In particular, the herein disclosed techniques pertain to scoring of time-decayed relationships (e.g., similarities, differences) between any sorts of objects.

FIG. 1B1 presents a diagram 1B100 that depicts several implementation techniques as used in systems that score interactions based on a time-series of events. As shown, a set of agents (e.g., "a1", "a2", . . . , "aM") interact with objects (e.g., "o1", "o2", "o3" . . . , "oM"). As used herein, the agents are implemented as any executable code that is capable of carrying out instructions so as to interact with one or more objects. Also, as used herein, the objects are implemented as computer representations over which an agent can interact. Strictly as examples, an agent might be an executable application or an executable "app", and an object might be a file. Again, strictly as examples, an agent-to-object interaction event might be a content read operation, or a content write operation, or a metadata read operation, or a metadata write operation, etc.

A sequence of time-stamped agent-to-object interaction events might be made accessible to an inter-agent scoring service 108. The inter-agent scoring service in turn performs a series of steps to (1) quantify interaction activities based at least in part on the time-stamped sequence of agent-to-object interaction events, (2) calculate time-decayed scores to quantify agent-to-object interaction similarities, and (3) store the time-decayed scores that pertain to corresponding agents. The stored time-decayed scores might be stored in a data structure of a corresponding agent or pair of agents, or it might be stored in some other representation such as a relational database table.

FIG. 1B2 presents a diagram 1B200 that depicts several implementation techniques as used in systems that score interactions based on a time-series of events. The figure a variation of the data that is made accessible to an inter-agent scoring service 108.

Specifically, and as shown, in addition to processing user-to-object attributes 104 and/or user-to-user collaboration scores $106_O$. The inter-agent scoring service 108 might be configured to process object-to-object affinities 107. Several embodiments that process object-to-object affinities 107 are shown and described as pertains to FIG. 1C.

FIG. 1C is a diagram that depicts a technique 1C00 for formation of user-to-user relationships based on object-to-object affinities 107. The shown technique includes a mechanism to store object-to-object affinities in a data structure. In the specific embodiment of FIG. 1C, the object-to-object affinities are stored in a table $125_1$ of a database. The aforementioned mechanisms to store object-to-object affinities in a data structure operates continuously such than as affinities are detected, they are stored in the table and, as affinities become no longer valid, they are removed from the table.

The table includes two key columns, shown as a "Key1" column and a "Key2" column. Each row comprises an object identifier in each of the "Key1" column and the "Key2" column, together with an affinity type indication corresponding to the particular objects that are identified in the "Key1" column and the "Key2" column. For example, object "o2" corresponds to "o3" due to an observed tendency (e.g., object o3 tends to be accessed by users after object o2 is accessed). The affinity type column can hold any characteristic. Strictly as the example of this FIG. 1C, an object-to-object affinity can be based on content analysis, or an object-to-object affinity can be based on access by users of the same group, or an object-to-object affinity can be based on an observed statistical tendency. In some situations, a given affinity type indication can have a corresponding affinity type weighting value, which affinity type weighting value can be used to quantify a magnitude of affinity between the two objects.

As shown in this example scenario, both user "u1" and user "u2" interact with object "o1". This is shown by the corresponding solid lines to object "o1". Also, in this scenario, user "u3" interacts with object "o2" and user "u4" interacts with object "o3", as shown by the respective solid lines. At this point in time in this scenario, user "u3" is not related to user "u4", however, by operation of the steps to generate user-to-user scores from object-to-object affinities 107, a user-to-user score (e.g., generated user-to-user score 129) can be calculated and applied to form a first-degree relationship between user "u4" and user "u3". Due to the relationship between object "o2" and object "o3", such as is depicted in table $125_1$, the shown affinity 127 can be applied between object "o2" and object "o3". User "u3" now has a relationship to object "o3" and user "u4" now has a relationship to object "o3". This is shown by the dotted lines. As such, there is now an imputed relationship between user "u3" and user "u4" are imputed to have a non-zero user-to-user score. This is depicted by the generated user-to-user score 129. Such an imputed user-to-user score can be generated by process $130_1$, and the generated user-to-user scores can be used in forming collaboration recommendations.

Over time, affinities between objects might decay or be eliminated. For example, if one or both of file "f2" and file "f3" become deleted, then the former affinity is removed and/or the entire row is deleted from the table. Also, over time, affinities between objects might be added or updated.

Figure 1D:
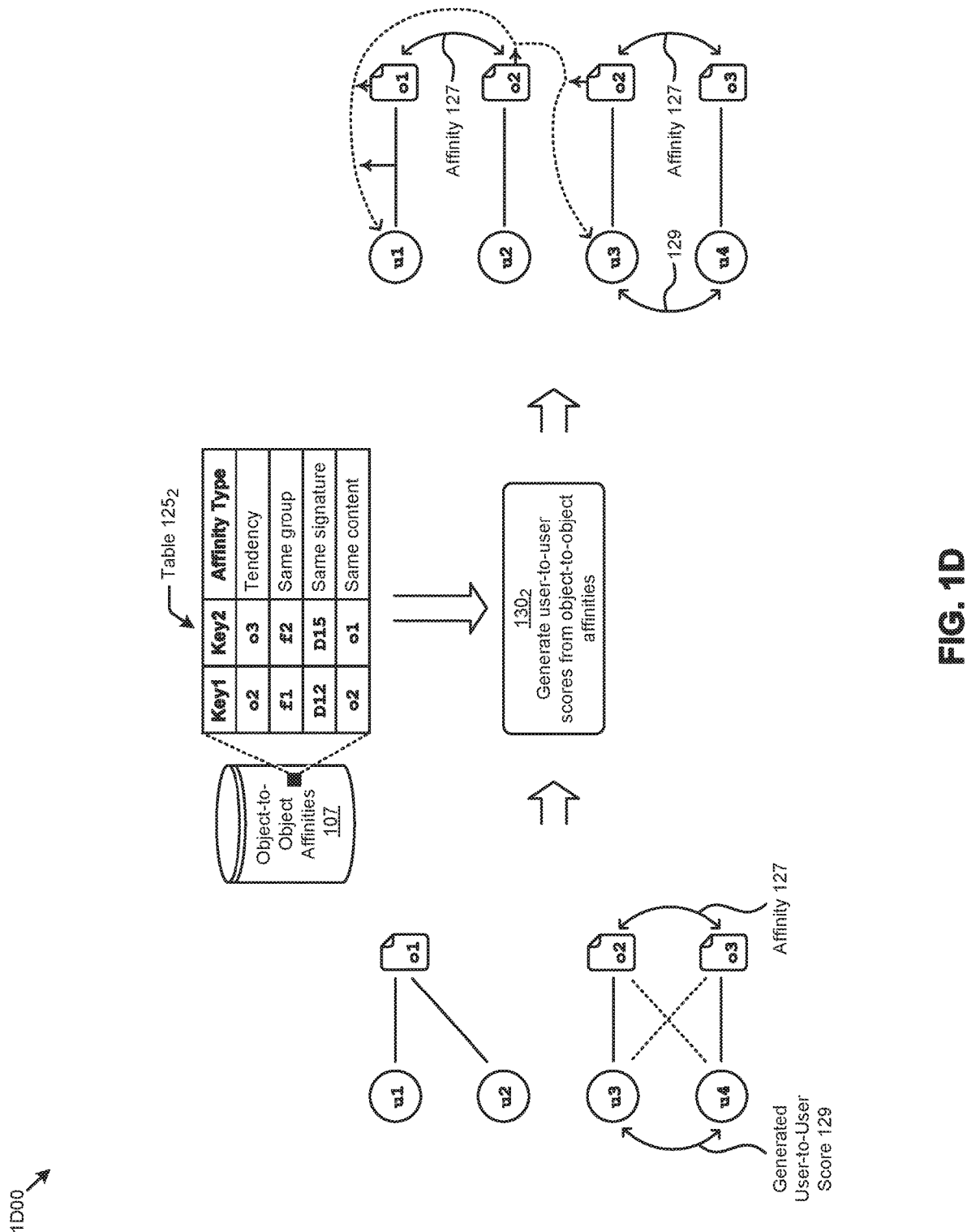
FIG. 1D is a diagram that depicts a technique for formation of multiple levels of user-to-user relationships based on object-to-object affinities, according to an embodiment.

One such example of an added row is shown in table $125_2$ of FIG. 1D. As shown, table $125_2$ comprises a row that relates object "o1" to object "o2" by its affinity type of "Same content". This affinity type refers to a match between at least some portion of the content of the two objects or a match between some portion of the content of their corresponding metadata. The metadata for an object might comprise dates (e.g., date of creation, date of modification, etc.), and/or security settings, and/or geographic storage locations, and/or subject or topic tags, and/or might characterize any content analysis that can be codified in metadata corresponding to the objects.

Now, because object "o1" and object "o2" are related, there is an implied relationship between users who access either object "o1" or object "o2". In this example, there is a relationship between user "u1" and user "u3". As shown, user "u3" accesses object "o2" as depicted by the solid line. Also, since table $125_2$ indicates an affinity between "o2" and "o1", a second-degree relationship between user "u3" and user "u1" can now be codified. This is shown in the dotted line path from user "u3" to user "u1". Still further, since user "u3" has a user-to-user relationship to user "u4" (e.g., the generated user-to-user score 129), and since user "u3" is now related to user "u1", this means that user "u1" is now related to user "u4". Certain embodiments of process $130_2$, can generate first-degree user-to-user relationships, and/or second-degree user-to-user relationships and/or third-degree user-to-user relationships, and so on.

Any of the foregoing relationships and/or interactions can be decayed over time. In one effect, this prevents table $125_2$ from growing unboundedly. Also, in a second effect, older relationships and/or interactions are deemed to be less important than newer relationships and/or interactions when forming collaboration recommendations.

Any of the foregoing relationships and/or interactions can be weighted. Furthermore, the weights can be used in sorting of the collaboration recommendation. Strictly as examples, the weights can correspond to the aforementioned degree (e.g., direct or indirect, or first-degree or second-degree, etc.). The weights can correspond to aspects of timing such that the same recommendations are not repeatedly presented to the exclusion of new possible recommendations. In some situations, diversity of recommendations is highly valued, and as such at least some collaboration recommendations that had not been previously recommended to a user are weighted higher.

Those of skill in the art will recognize that the technique of FIG. 1C can be applied when the corpus of relationships and/or interactions is sparse. In some situations, techniques involving object-to-object affinities are used to "bootstrap" recommendations in the face of sparsity. In some situations, use of object-to-object affinities is varied over time such that in a first time period, the object-to-object affinities dominate the formation of recommendations, whereas in a second time period, user-to-object scores dominate the formation of recommendations.

FIG. 2 depicts a diagram that shows several event-based collaboration recommendation techniques 200 as implemented in systems that facilitate forming collaboration recommendations based at least in part on the then-current events over shared content. As an option, one or more variations of event-based collaboration recommendation techniques 200 or any aspect thereof may be implemented in the context of the architecture and functionality of the embodiments described herein. The event-based collaboration recommendation techniques 200 or any aspect thereof may be implemented in any environment.

The event-based collaboration recommendation techniques 200 present one embodiment of certain steps and/or operations that facilitate forming collaboration recommendations based at least in part on the then-current events over shared content. As shown, the steps and/or operations can be performed at the collaboration recommendation service 102. As illustrated, the event-based collaboration recommendation techniques 200 can commence by receiving event objects that describe interaction events between users and content objects (step 210). The event objects are analyzed to determine a set of user-to-object attributes for the users that are derived from user-to-object interaction events (step 230). As an example, the user-to-object attributes might be stored in an array of user-to-object interaction scores. Values (e.g., score components) stored in such an array quantify the nature and degree of user-to-object interaction activity that a particular user has with a respective set of content objects.

A subset of steps and/or operations to determine a set of user-to-user collaboration scores (step 250) can commence with incrementally updating merely the portion or portions of the score components of the user-to-user collaboration scores that are affected by the user-to-object interaction events (step 252). For example, a received event object for some user-to-object interaction event might invoke a change to one or more user-to-object attributes, which in turn might invoke a process or thread to perform an incremental update to one or more score components of one or more user-to-user collaboration scores. The user-to-user collaboration scores affected by the user-to-object interaction events are then calculated using the incrementally updated score components and/or other score components (step 254). The user-to-user collaboration scores are continually monitored to identify collaboration candidates to recommend to the users (step 270).

Figure 3:
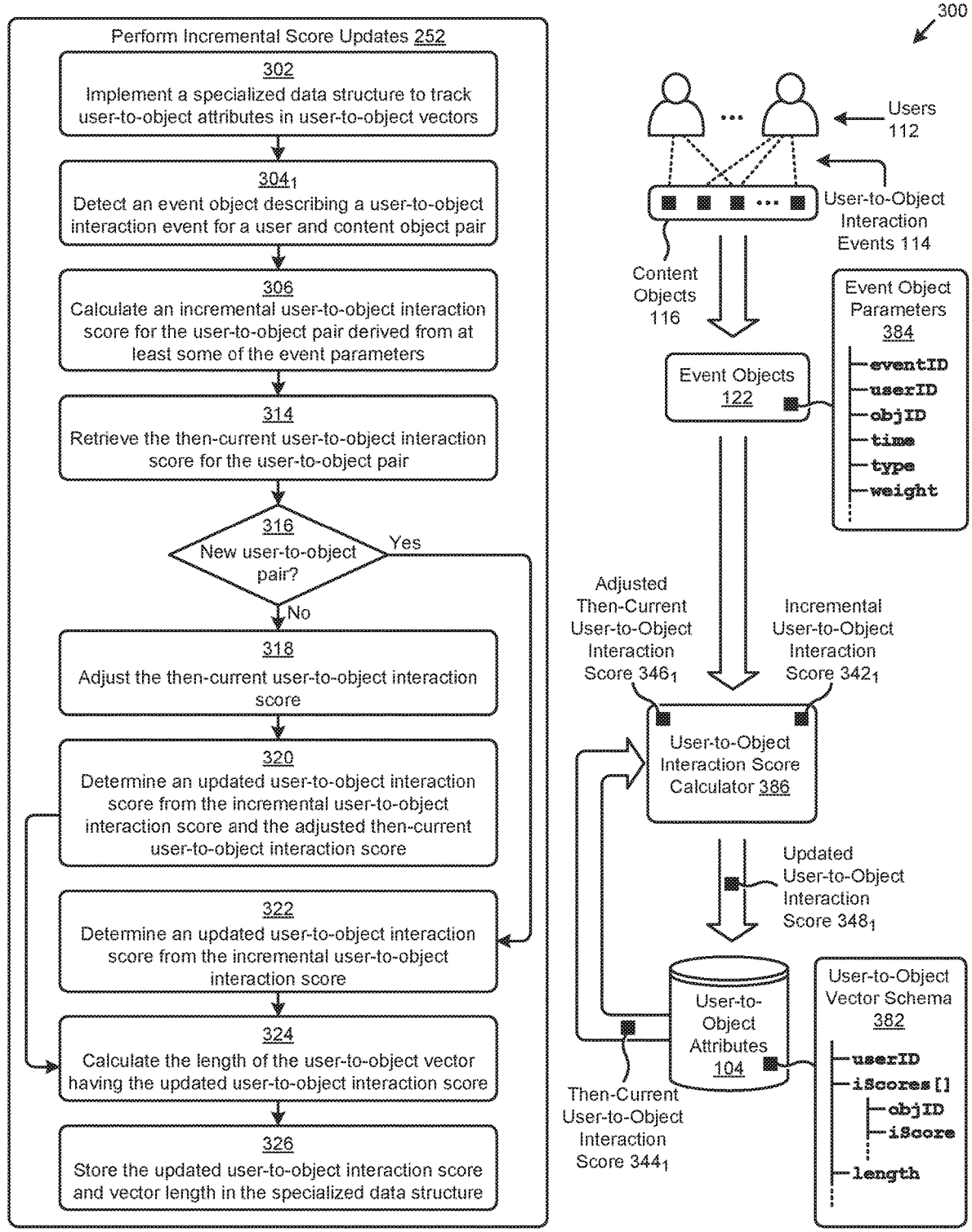
FIG. 3 presents a user-to-object attribute update technique as implemented in systems that form collaboration recommendations based at least in part on the then-current events over shared content, according to an embodiment.

A detailed embodiment of step 230 of FIG. 2 is presented and discussed as pertains to FIG. 3.

FIG. 3 presents a user-to-object attribute update technique 300 as implemented in systems that form collaboration recommendations based at least in part on the then-current events over shared content. As an option, one or more variations of user-to-object attribute update technique 300 or any aspect thereof may be implemented in the context of the architecture and functionality of the embodiments described herein. The user-to-object attribute update technique 300 or any aspect thereof may be implemented in any environment.

The user-to-object attribute update technique 300 presents one embodiment of certain steps and/or operations that efficiently update user-to-object attributes to facilitate collaboration recommendations based at least in part on the then-current events over shared content. Various illustrations are also presented to illustrate the user-to-object attribute update technique 300. Further, specialized data structures designed to improve the way a computer stores and retrieves data in memory when performing steps and/or operations pertaining to user-to-object attribute update technique 300 are also shown in FIG. 3, in particular, a set of object parameters that include a "time" (e.g., a timestamp) is shown. The occurrence of the "time" in a stream of event objects supports a calculation of a time decayed value of a previously-stored score, which updated score then becomes a quantity that is used in subsequent user-to-user scoring. Such a specialized data structure serves to improve the way a computer stores, retrieves, and calculates using previously-stored scores when updating user-to-object quantities.

The user-to-object attribute update technique 300 is depicted as a series of steps that perform incremental score updates. Such steps are one embodiment of the aforementioned step 252 as introduced in FIG. 2. As shown, the user-to-object attribute update technique commences by implementing a specialized data structure to track user-to-object attributes in a set of user-to-object vectors (step 302). For example, the user-to-object vectors might be stored in user-to-object attributes 104 with a data structure corresponding to a user-to-object vector schema 382. The user-to-object vectors codify user-to-object attributes that characterize interaction activities between a particular user and a particular content object. The data comprising the user-to-object vectors, user-to-object attributes, and/or any data structure described herein can be organized and/or stored using various techniques. As one possible implementation example, the user-to-object vectors might be organized and/or stored in programming code objects that have instances corresponding to respective particular users and that have properties corresponding to the various user-to-object vector elements pertaining to respective users.

In another possible implementation example, vectors (e.g., user-to-object vectors, user-to-user vectors, etc.) are stored sparsely. Specifically, only entries in a vector that are non-zero are stored in the data structure that holds the vectors. Moreover, the vectors are stored for fast retrieval of the largest ones of the stored entries of a particular vector. For example, the largest entries in a vector might be stored in a group that is situated beginning at the head of the vector. Alternatively, the largest entries in a vector might be stored in an ordered linked list that can be addressed from the head of the vector. In some cases vectors are maintained by a service that maintains its own storage space and that responds to queries for vectors. Such queries can specify the form (e.g., a list, a programming object, a relation, etc.) and/or organization (e.g., employing a particular filter, and/or in a particular sorted order, etc.) of the expected results from execution of the query.

In another possible implementation example, data items of the user-to-object vector schema 382 might be organized and/or stored in a tabular structure (e.g., relational database table) that has rows corresponding to a particular user and columns corresponding to various user-to-object vector elements for that user.

As depicted in user-to-object vector schema 382, a particular user-to-object vector (e.g., table row or object instance) might describe a user identifier (e.g., stored in a "user ID" field), an array of user-to-object interaction scores (e.g., stored in an "iScores [ ]" object), a vector magnitude or length (e.g., stored in a "length" field), and/or other vector elements. As shown, the "iScores [ ]" object might comprise child elements that correspond to a content object identifier (e.g., stored in a "objID" field) and an associated user-to-object interaction score (e.g., stored in an "iScore" field).

The user-to-object attribute update technique 300 further detects an event object that describes a user-to-object interaction event for a user and content object pair (step 304$_1$). For example, and as illustrated, the event object might be one of event objects 122 corresponding to user-to-object interaction events 114 introduced by interactions by users 112 with a set of content objects 116. The event objects comprise data that characterize the user-to-object interaction events. Specifically, and as depicted in event object parameters 384, the event objects can be organized (e.g., in an object instance) to associate a particular user-to-object interaction event identified by an event identifier (e.g., stored in an "eventID" field) with a user identifier (e.g., stored in a "userID" field), an object identifier (e.g., stored in an "objID" field), a timestamp (e.g., stored in a "time" field), an interaction event type (e.g., stored in a "type" field), an interaction weight (e.g., stored in a "weight" field), and/or other event parameters. In certain embodiments, the interaction weight might correspond to, and/or be determined at least in part by, a function of the interaction event type (e.g., a mapping function, a scaling function, etc.).

For example, an interaction weight of "10" might be assigned to an "edit" interaction, while an interaction weight of "6" might be assigned to a "preview" interaction. The foregoing interaction weight examples are merely for illustration. Other weightings might derive from a quantification of a degree of sharing of the content, and/or a quantification of a degree to which the content has been changed, and/or a quantification of a degree the content has been downloaded, published, etc. At least some of the event parameters derived from the event object are used to calculate an incremental user-to-object interaction score for the user-toobject pair associated with the user-to-object interaction event (step 306). For example, a user-to-object interaction score calculator 386 might calculate the incremental user-to-object interaction score 342₁.

A then-current user-to-object interaction score is retrieved for the user-to-object pair associated with the user-to-object interaction event (step 314). For example, the then-current user-to-object interaction score 344₁ might be retrieved by user-to-object interaction score calculator 386 from the user-to-object attributes 104. Existence of a then-current user-to-object interaction score indicates the user-to-object pair is not new (see "No" path of decision 316). Certain adjustments might be performed on the retrieved then-current user-to-object interaction score (step 318). The then-current user-to-object interaction score 344₁ might be adjusted (e.g., to establish an adjusted then-current user-to-object interaction score 346₁) to a level that can accurately represent past user-to-object interaction activity in an updated user-to-object interaction score. As an example, a then-current user-to-object interaction score that was earlier established (e.g., based at least in part on earlier-detected event objects) might be recalculated to discount the contribution of past user-to-object interaction activity between the associated user and content object in an updated user-to-object interaction score. As an example, step 320 serves to determine (e.g., recalculate or otherwise adjust) an updated user-to-object interaction score 348₁ from the incremental user-to-object interaction score 342₁. The updated user-to-object interaction score 348₁ is stored for accessibility by subsequent calculations.

Using this technique, updating the updated user-to-object interaction score is performed using exactly one then-current user-to-object interaction score and exactly one incremental user-to-object interaction score. In this way, by considering the incremental user-to-object interaction score (e.g., based at least in part on the detected event object) and the adjusted user-to-object interaction score (e.g., based at least in part on earlier-detected event objects), the updated user-to-object interaction score accounts for all user-to-object interaction activity between the user and the content object. The updated user-to-object interaction score is stored until a later user-to-object interaction so as to be available for use as a user-to-object interaction score that accounts for all user-to-object interaction activity between the user and the content object up until the moment of that later user-to-object interaction.

Continuing with discussion of this user-to-object attribute update technique 300, in cases where the detected event object corresponds to a new user-to-object pair (see "Yes" path of decision 316), the updated user-to-object interaction score is determined from the incremental user-to-object interaction score since no then-current user-to-object interaction score exists, thus processing progresses to step 322.

In the shown embodiment, the magnitude or length of the user-to-object vector comprising the updated user-to-object interaction score is also calculated (step 324). As described herein, the vector length is used to calculate user-to-user collaboration scores, in accordance with some embodiments. When the length of the user-to-object vector is updated, the updated user-to-object score and vector length are stored in the specialized data structure (step 326).

With such user-to-object vectors often comprising several hundreds or even thousands of elements (e.g., user-to-object pairs) that are continually updated responsive to detected user-to-object interaction events, techniques for efficiently calculating the user-to-object vector length are implemented. One technique for efficiently calculating the user-to-object vector length might involve an estimate using only integer calculations.

In some situations, such as when vector lengths are being manipulated and/or compared, the formula shown in EQ. 1 might be used to update a user-to-object vector length L responsive to a change (e.g., update) to one of its constituent elements E (e.g., user-to-object interaction score):

$$L_U = \sqrt{L_{TC}^2 - E_{TC}^2 + E_U^2}$$ (EQ. 1)

where:
$L_U$=the updated user-to-object vector length,
$L_{TC}$=the then-current user-to-object vector length,
$E_U$=an updated user-to-object vector element (e.g., user-to-object interaction score), and
$E_{TC}$=the then-current user-to-object vector element.

Figure 4A:
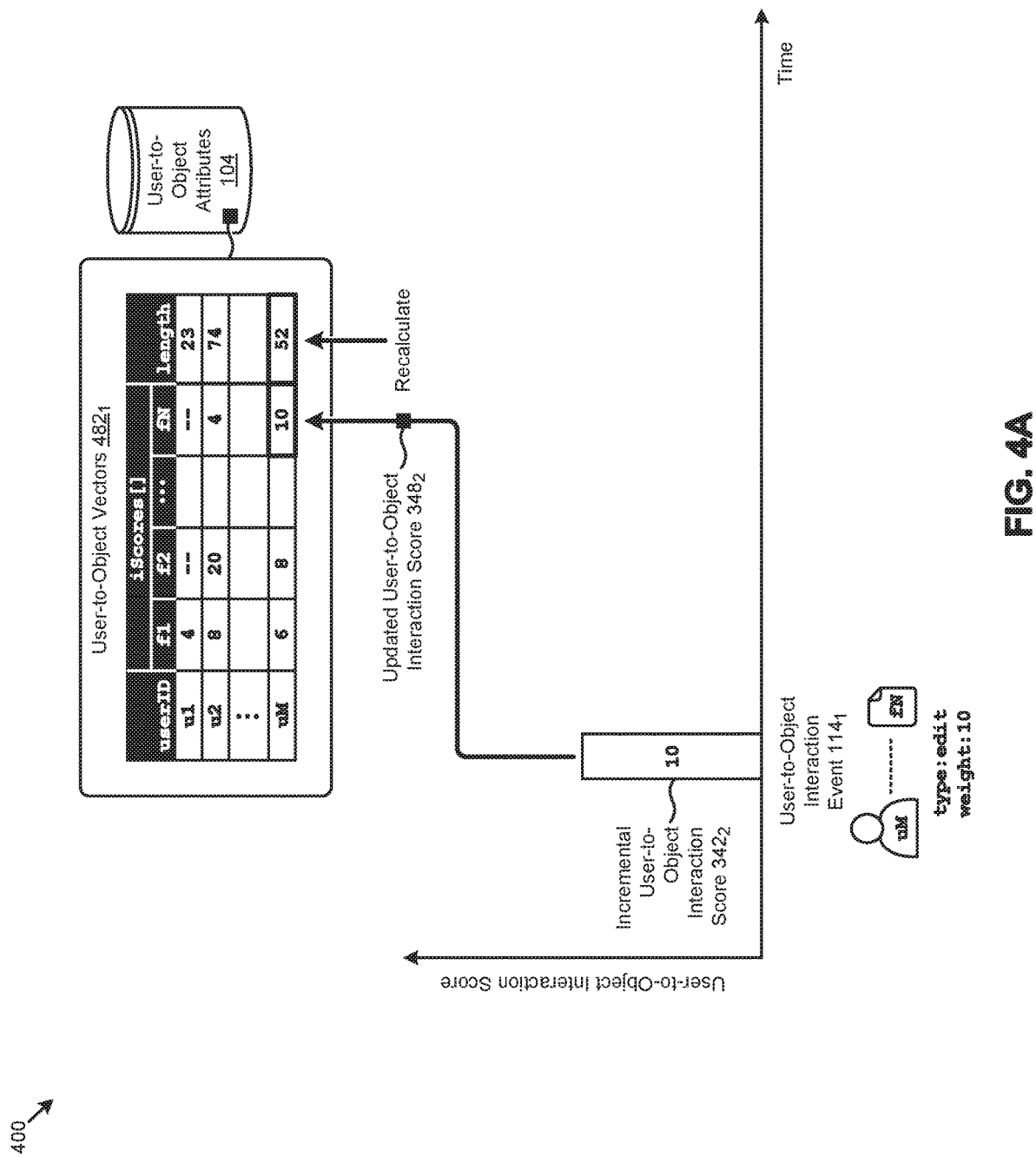
FIG. 4A, FIG. 4B, and FIG. 4C illustrate a user-to-object attribute recalculation scenario as implemented in systems that issue collaboration recommendations based at least in part on the then-current events over shared content, according to an embodiment.
Figure 4B:
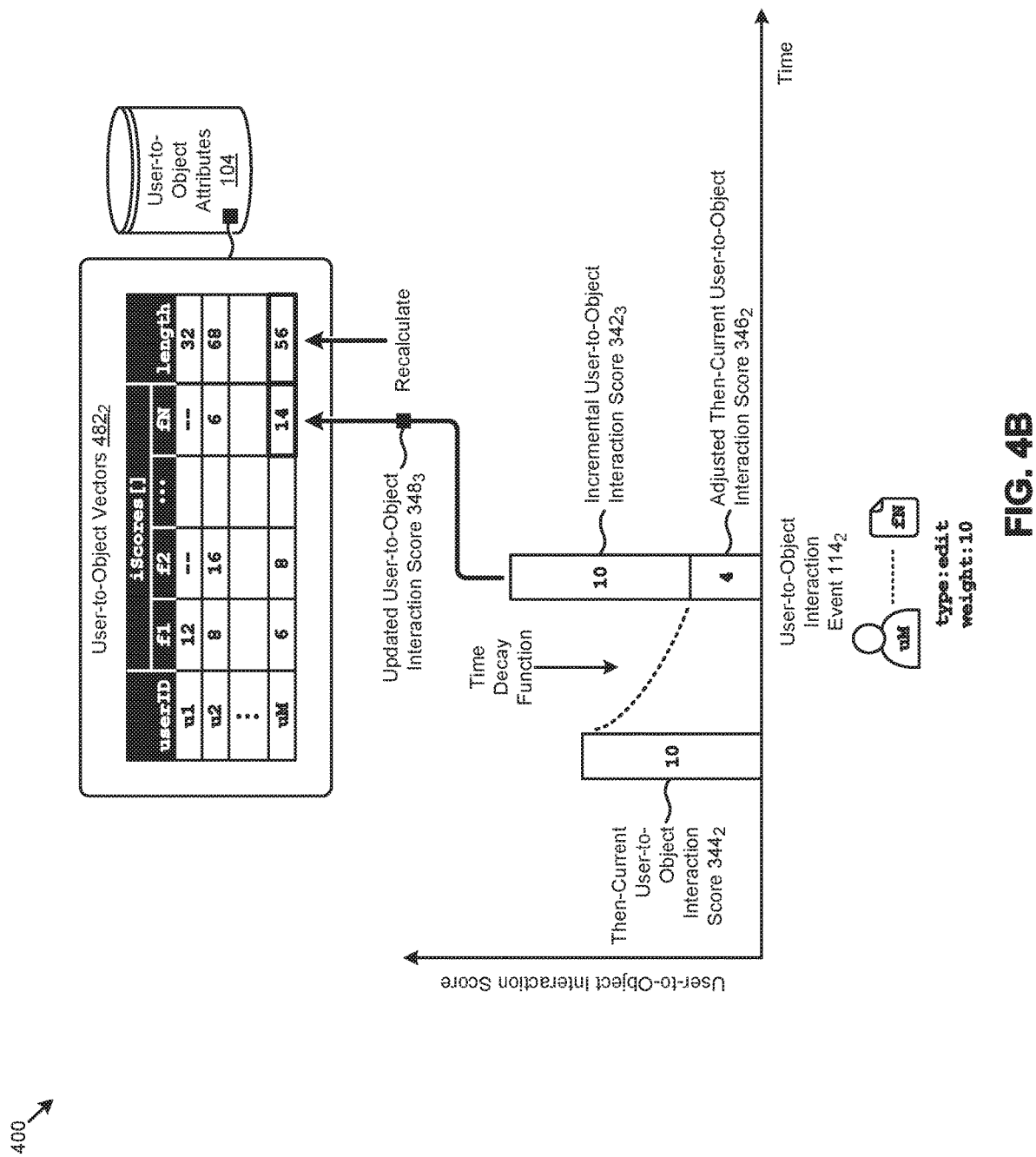
Figure 4C:
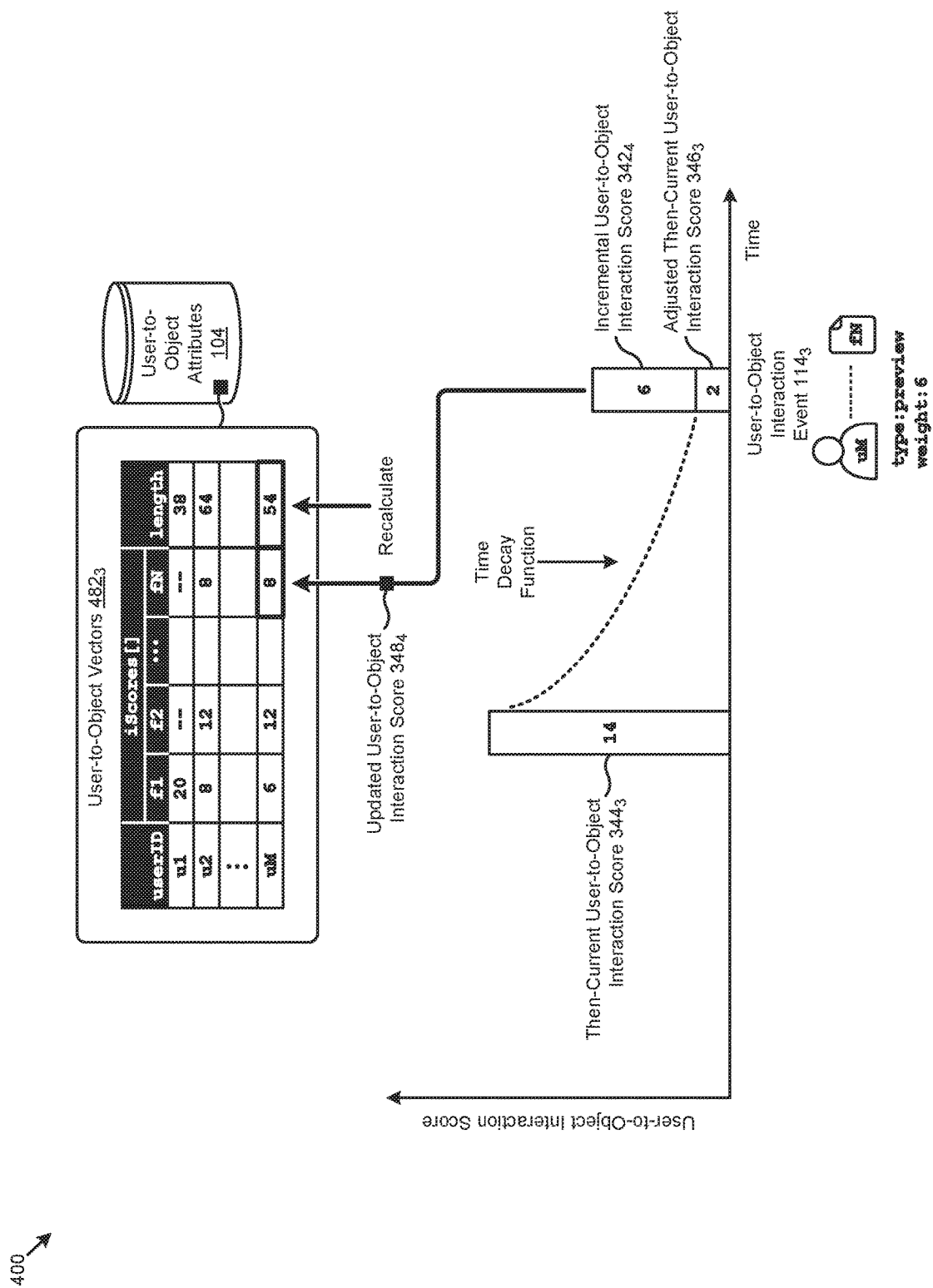

A scenario illustrating an implementation of the user-to-object attribute update technique 300 is shown and described as pertains to FIG. 4A, FIG. 4B, and FIG. 4C.

FIG. 4A, FIG. 4B, and FIG. 4C illustrate a user-to-object attribute recalculation scenario 400 as implemented in systems that issue collaboration recommendations based at least in part on the then-current events over shared content. As an option, one or more variations of user-to-object attribute recalculation scenario 400 or any aspect thereof may be implemented in the context of the architecture and functionality of the embodiments described herein. The user-to-object attribute recalculation scenario 400 or any aspect thereof may be implemented in any environment.

The user-to-object attribute recalculation scenario 400 in FIG. 4A, FIG. 4B, and FIG. 4C present a time sequence of user-to-object attribute updates responsive to a corresponding time sequence of a user-to-object interaction event, according to the herein disclosed techniques. Specifically, FIG. 4A depicts a user-to-object interaction event 114₁ occurring at a first moment in time. As shown, user-to-object interaction event 114₁ corresponds to an "edit" interaction between user "uM" and object "fN". As further indicated, the "edit" interaction is assigned an interaction weight of "10". Such assignments between interaction event types and interaction weights might be codified in a rule base for the various types of interactions. Using the rule base, the interaction weights can be set so as to best characterize the importance of the user-to-object interaction activity. For example, a first user that briefly previews a first document might have a weak relationship with that first document as quantified in a lower interaction weight (e.g., "weight=6"), while a second user that spends hours editing a second document might have a strong relationship with that second document as quantified by a higher interaction weight (e.g., "weight=10").

As represented in a two-dimensional space comprising a user-to-object interaction score dimension and a time dimension, an incremental user-to-object interaction score 342₂ corresponding to user-to-object interaction event 114₁ is set to a value of 10. In this case, the incremental user-to-object interaction score is equal to the interaction weight of the corresponding event. As can be observed in the shown instance of user-to-object vectors 482₁ (e.g., stored in user-to-object attributes 104), the incremental user-to-object interaction score 342₂ is stored as the updated user-to-object interaction score 348₂ in the element corresponding to object "fN" of the user-to-object vector of user "uM". In this portion of the scenario, no then-current user-to-object interaction score (e.g., from earlier detected interaction events) is considered, thereby suggesting that user-to-object interaction event 114₁ pertains to the first interaction of user "uM"

with object "fN". As earlier described, the length of the user-to-object vector (e.g., "length=52") for user "uM" can also be recalculated with the updated user-to-object interaction score.

Referring to FIG. 4B, a user-to-object interaction event $114_2$ occurs at a second moment in time. As shown, user-to-object interaction event $114_2$ corresponds to an "edit" interaction with an interaction weight of "10". An incremental user-to-object interaction score $342_3$ corresponding to user-to-object interaction event $114_2$ is set to a value of 10 (e.g., equal to the interaction weight). A then-current user-to-object interaction score $344_2$ (e.g., updated responsive to user-to-object interaction event $114_1$) is retrieved and adjusted (e.g., using a time decay function, or using a time decay factor) to an adjusted then-current user-to-object interaction score $346_2$ having a value of 4. The adjusted then-current user-to-object interaction score $346_2$ is established to represent the contribution in an updated user-to-object interaction score of any user-to-object interaction activity prior to detecting the user-to-object interaction event $114_2$. Specifically, an updated user-to-object interaction score $348_3$ is determined from the incremental user-to-object interaction score $342_3$ and the adjusted then-current user-to-object interaction score $346_2$. The updated user-to-object interaction score $348_3$ (e.g., "14") and recalculated user-to-object vector length (e.g., "56") are stored in user-to-object attributes 104 as depicted in user-to-object vectors $482_2$.

The foregoing technique is merely one possible technique involving applying a time decay function to recalculate a new user-to-object interaction score. Other techniques might involve variations that include scaling or otherwise adjusting quantities pertaining to prior activities, and/or scaling or otherwise adjusting values pertaining to new interactions based at least in part on quantities pertaining to prior activities. In some scenarios, a predictor might use the foregoing techniques to compare and/or to make predictions pertaining to specific user relationships to specific files (e.g., to predict which user should receive a recommendation to access which files) and/or to make predictions pertaining to specific files and relationships to other files (e.g., to predict which file or groups of files are related to other files or groups of files).

Referring to FIG. 4C, a user-to-object interaction event $114_3$ occurs at a third moment in time. The user-to-object interaction event $114_3$ corresponds to a "preview" interaction with an interaction weight of "6". An incremental user-to-object interaction score $342_4$ that corresponds to user-to-object interaction event $114_3$ is set to a value of 6 (e.g., equal to the interaction weight). A previously-stored user-to-object interaction event score (e.g., the shown then-current user-to-object interaction score $344_3$) is updated responsive to user-to-object interaction event $114_2$. It is updated to form an adjusted then-current user-to-object interaction score $346_3$ having a value of 2. The adjusted then-current user-to-object interaction score $346_3$ is established to represent the contribution in an updated user-to-object interaction score of any user-to-object interaction activity prior to detecting the user-to-object interaction event $114_3$. An updated user-to-object interaction score $348_4$ is determined from the incremental user-to-object interaction score $342_4$ and the adjusted then-current user-to-object interaction score $346_3$. The updated user-to-object interaction score $348_4$ (e.g., "8") and recalculated user-to-object vector length (e.g., "54") are stored in user-to-object attributes 104 as depicted in user-to-object vectors $482_3$.

As illustrated in user-to-object attribute recalculation scenario 400, the adjusted then-current user-to-object interaction scores might be a time-decayed version of the corresponding then-current user-to-object interaction scores. One approach to calculating such a time-based decay might be a timestamp corresponding to the moment in time each user-to-object interaction score is updated. Upon the occurrence of an interaction event that affects a particular user-to-object interaction score, this timestamp can be retrieved and a time decay function can be used to calculate a time decay to apply to the then-current user-to-object interaction score.

In some embodiments, multiple time decay functions can be defined to accommodate different settings for the time-decay values that correspond to different types of interactions. For example, a first time decay function having a first setting (e.g., 2) might be applied to content read operations or interaction events, while a second time decay function having a second setting (e.g., 1) might be applied to content write operations or interaction events. A relatively larger (or relatively smaller) time-decay value applied to a particular type of interaction indicates a relatively shorter (or relatively longer) persistence in a user-to-object interaction score. During event processing, a faster time decay function having a relatively larger time-decay value, or a slower time decay function having a relatively smaller time-decay value, can be selected based at least in part one or more characteristics of the interaction event being processed.

In highly scalable and dynamic distributed computing and storage systems, the computing, storage, and networking resources used to store and retrieve the timestamps can be significant. In certain embodiments, the herein disclosed techniques eliminate timestamp storage and retrieval by embedding the timestamp in an incremental user-to-object interaction score. EQ. 2 shows an example equation for calculating an incremental user-to-object interaction score $IIS_j$ responsive to an interaction event that occurred at time $t_j$:

$$IIS_j = e^{-Kt_j} w_j \quad \text{(EQ. 2)}$$

where:
$IIS_j$=an instance j of an incremental user-to-object interaction score,
$t_j$=the time of the interaction event invoking calculation of $IIS_j$,
$w_j$=the interaction weight of the interaction event, and
K=the adjustable time-decay value.

With this approach, an updated user-to-object interaction score $UIS_k$ that corresponds to an interaction event that occurred at time $t_k$ can be calculated as shown in EQ. 3:

$$UIS_k = UIS_{TC} + IIS_k \quad \text{(EQ. 3)}$$

where:
$UIS_k$=an instance k of an updated user-to-object interaction score,
$IIS_k$=an instance k of an incremental user-to-object interaction score,
$t_k$=the time of the interaction event invoking calculation of $UIS_k$ and $IIS_k$,
$UIS_{TC}$=the then-current user-to-object interaction score at time $t_k$, and
K=an adjustable time-decay value.

The foregoing equations EQ. 2 and EQ. 3 can be combined to construct a general formula for calculating a user-to-object interaction score $IS_t$ for any time t:

$$IS_t = e^{Kt} UIS_{TC} \quad \text{(EQ. 4)}$$

where:
$IS_t$=the user-to-object interaction score at time t,
K=an adjustable time-decay value, and $UIS_{TC}$=the user-to-object interaction score as of the time of the last interaction.

Data structures that contain the quantity $IS_t$ of EQ.4 can be stored so as to be retrieved at any future time. Storage of the quantity of the most recent then-current user-to-object interaction score $IS_t$ on an ongoing basis serves to keep a running value from which a subsequent time decayed value can be calculated at any subsequent time T=t using the time-decaying characteristics of EQ.2 and EQ. 4.

Figure 5:
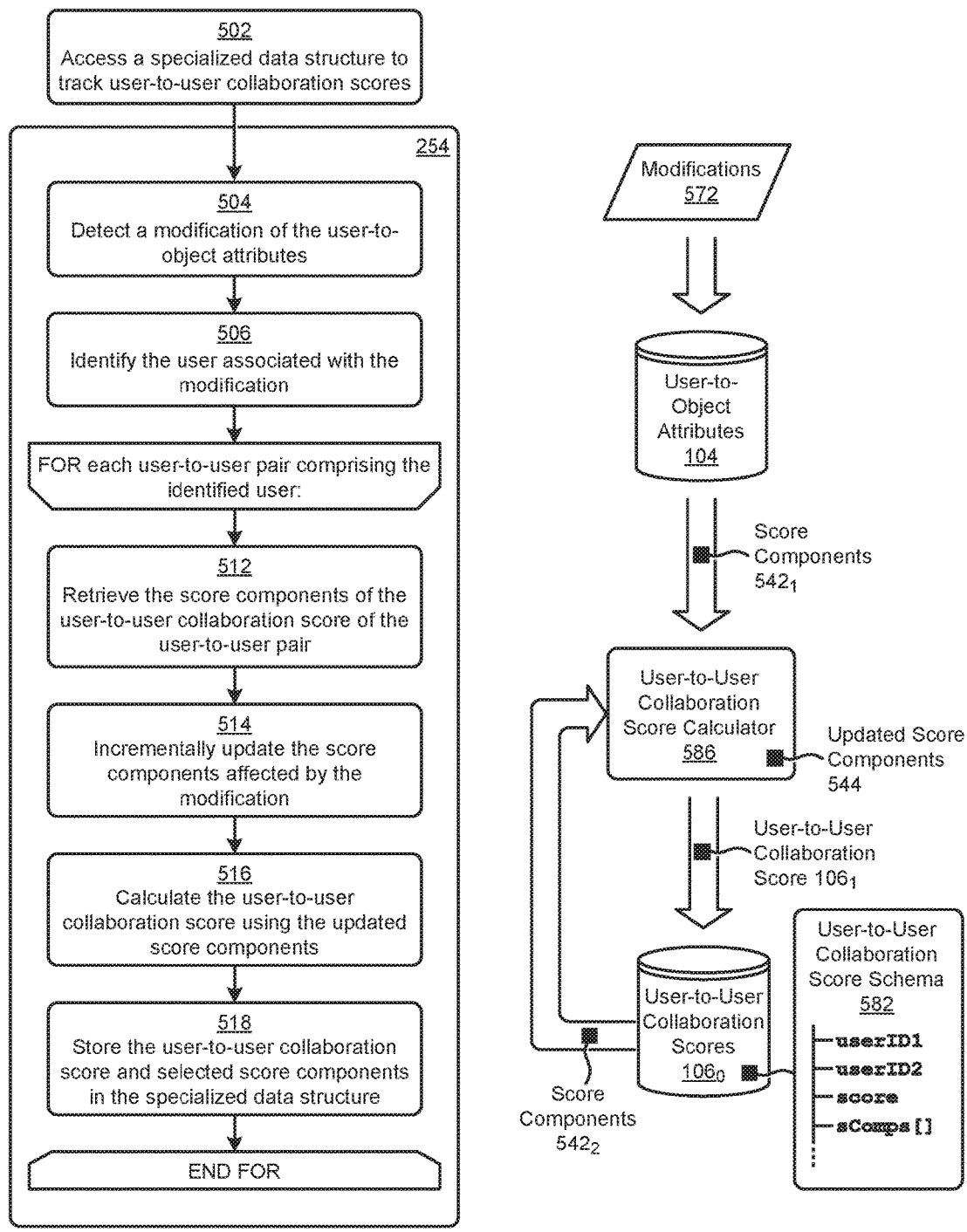
FIG. 5 presents a user-to-user collaboration scoring technique as implemented in systems that form collaboration recommendations based at least in part on the then-current events over shared content, according to an embodiment.

One embodiment of a technique for using the foregoing user-to-object interaction scores and/or other user-to-object attributes to determine user-to-user collaboration scores is presented and discussed as pertains to FIG. 5.

FIG. 5 presents a user-to-user collaboration scoring technique 500 as implemented in systems that form collaboration recommendations based at least in part on the then-current events over shared content. As an option, one or more variations of user-to-user collaboration scoring technique 500 or any aspect thereof may be implemented in the context of the architecture and functionality of the embodiments described herein. The user-to-user collaboration scoring technique 500 or any aspect thereof may be implemented in any environment.

The user-to-user collaboration scoring technique 500 presents one embodiment of certain steps and/or operations that efficiently determine user-to-user collaboration scores to facilitate collaboration recommendations based at least in part on the then-current events over shared content. Various illustrations are also presented to illustrate the user-to-user collaboration scoring technique 500. Further, specialized data structures designed to improve the way a computer stores and retrieves data in memory when performing steps and/or operations pertaining to user-to-user collaboration scoring technique 500 are also shown in FIG. 5.

As shown, the user-to-user collaboration scoring technique 500 can commence by implementing a specialized data structure to track user-to-user collaboration scores (step 502). For example, the user-to-user collaboration scores might be stored in user-to-user collaboration scores $106_O$ with a data structure corresponding to a user-to-user collaboration score schema 582. Such user-to-user collaboration scores provide a quantitative indication of the content object interaction similarities between a respective pair of users. The data stored in user-to-user collaboration scores $106_O$ according to user-to-user collaboration score schema 582 can be organized and/or stored using various techniques. For example, the user-to-user collaboration score data might be organized and/or stored in a tabular structure (e.g., relational database table) or in a programming code object. As depicted in user-to-user collaboration score schema 582, a particular user-to-user pair identified by a first user identifier (e.g., stored in a "userID1" field) and a second user identifier (e.g., stored in a "userID2" field) can be associated with a user-to-user collaboration score (e.g., stored in a "score" field), an array of score components used to calculate the user-to-user collaboration score (e.g., stored in a "stomps [ ]" object), and/or other user-to-user collaboration score attributes.

The user-to-user collaboration scoring technique 500 further detects a modification of certain user-to-object attributes (step 504). For example, modifications 572 might be applied to user-to-object attributes 104 which comprise, among other data, a set of user-to-object interaction scores. The user associated with the detected modification (e.g., updated user-to-object interaction score) is identified (step 506). For each user-to-user pair that comprises the identified user, certain steps and/or operations are executed as depicted in FIG. 5. For example, if the identified user is user "uM", certain steps and/or operations are performed for each user-to-user pair comprising user "uM" (e.g., pair "uM-u1", pair "uM-u2", etc.) according to the user-to-user collaboration scoring technique 500.

Specifically, the score components for the user-to-user collaboration score of the user-to-user pair are retrieved (step 512). For example, a user-to-user collaboration score calculator 586 might retrieve some score components (e.g., score components $542_1$) from user-to-object attributes 104, some score components (e.g., score components $542_2$) from user-to-user collaboration scores $106_O$, and/or some components from other sources. Such score components comprise any number of quantities that are mathematically combined to derive a respective user-to-user collaboration score. As an example, if a user-to-user collaboration score is determined from a cosine-similarity formula applied to the respective user-to-object vectors of a user-to-user pair, the score components might comprise the dot-product of the user-to-object vectors, and/or one or both of the vector lengths. In this case, the dot-product of the vectors might be stored in the "sComps [ ]" array in user-to-user collaboration scores $106_O$ and the vector lengths might be stored in the "length" fields in user-to-object attributes 104.

The score components affected by the detected modification to the user-to-object attributes are incrementally updated (step 514). As an example, if the detected modification pertains to user "uM", merely the dot-product score components comprising the user-to-object vector of user "uM" are updated, while all other dot-product score components are not updated. Further, since any portion or portions of score components for user "uM" can be stored in a specialized data structure (e.g., in user-to-user collaboration scores $106_O$) according to the herein disclosed techniques, the portion or portions of the score components can be incrementally updated so as to improve the way that a computer stores and retrieves data in memory and/or improve the way data is manipulated when performing computerized operations. Specifically, as shown in EQ. 5, a particular score can be incrementally updated by updating only the portion or portions that are changed due to passage of time:

$$(\vec{UM} \cdot \vec{UN})_{new} = (\vec{UM} \cdot \vec{UN})_{old} - (EM_{old} \cdot EN) + (EM_{new} \cdot EN) \quad (EQ.\ 5)$$

where:

$(\vec{UM} \cdot \vec{UN})_{new}$=a new dot-product of vectors $\vec{UM}$ and $\vec{UN}$, $(\vec{UM} \cdot \vec{UN})_{old}$=an old (e.g., stored) dot-product of vectors $\vec{UM}$ and $\vec{UN}$, $EM_{old}$=an old value of modified element in vector $\vec{UM}$, $EM_{new}$=a new value of modified element in vector $\vec{UM}$, and EN=the value of element in vector $\vec{UN}$ associated with modified element.

As such, in this example, upon updating the various score components (e.g., by updating only the quantity ($EM_{new} \cdot EN$)), the new, updated user-to-user collaboration score $(\vec{UM} \cdot \vec{UN})_{new}$ can be calculated (step 516) and stored with selected score components (e.g., dot-product, vector lengths, etc.) in the specialized data structure (step 518). As shown, the user-to-user collaboration score calculator 586 can retrieve the updated score components 544 and/or other score components (e.g., unmodified score components) to calculate a user-to-user collaboration score $106i$. More specifically, a user-to-user collaboration score CS for a user "uM" having a user-to-object vector UM and a user "uN" having a user-to-object vector UN according to the cosine-similarity formula is shown in EQ. 6:

$$CS=[\vec{UM}\cdot\vec{UN}]/[\|\vec{UM}\|\|\vec{UN}\|] \quad \text{(EQ. 6)}$$

where:
CS=a user-to-user collaboration score,
$\vec{UM}$=a user uM user-to-object vector,
$\vec{UN}$=a user uN user-to-object vector,
$\|\vec{UM}\|$=the magnitude (e.g., length) of $\vec{UM}$, and
$\|\vec{UN}\|$=the magnitude (e.g., length) of $\vec{UN}$.

In some cases, only a portion of the score components are incrementally updated when updating the user-to-user collaboration score so as to facilitate collaboration recommendations based at least in part on the then-current events over shared content. An example scenario illustrating such incremental updating is shown and described as pertains to FIG. 6.

Figure 6:
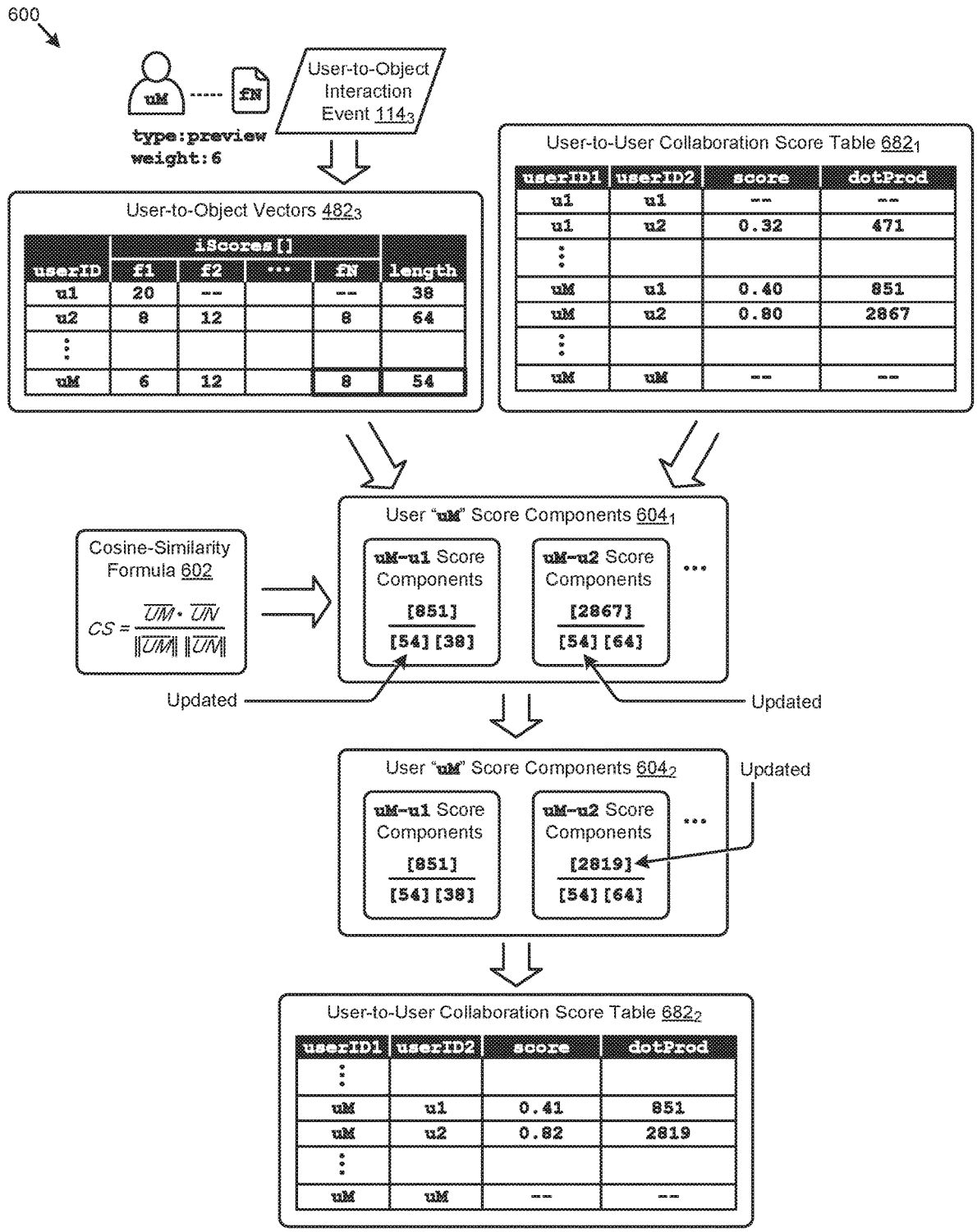
FIG. 6 illustrates a user-to-user collaboration scoring scenario as implemented in systems that form collaboration recommendations based at least in part on the then-current events over shared content, according to an embodiment.

FIG. 6 illustrates a user-to-user collaboration scoring scenario 600 as implemented in systems that form collaboration recommendations based at least in part on the then-current events over shared content. As an option, one or more variations of user-to-user collaboration scoring scenario 600 or any aspect thereof may be implemented in the context of the architecture and functionality of the embodiments described herein. The user-to-user collaboration scoring scenario 600 or any aspect thereof may be implemented in any environment.

The user-to-user collaboration scoring scenario 600 in FIG. 6 presents a flow of score components and other data to facilitate calculation of a user-to-user collaboration score in response to a detected user-to-object interaction event. Specifically, user-to-object interaction event $114_3$ earlier described might be detected. As shown, user-to-object interaction event $114_3$ corresponds to a "preview" interaction with object "fN" by user "uM" and with an interaction weight of "6". Responsive to detecting the user-to-object interaction event $114_3$, the representative sample of user-to-object vectors $482_3$ is updated. For example, the "uM-fN" user-to-object interaction score is updated to "8" and the user "uM" vector length is updated to "54". Selected attributes associated with user "u1" and user "u2" are also shown in user-to-object vectors $482_3$. Representative data pertaining to user-to-user collaboration scores at the time the user-to-object interaction event $114_3$ is detected is also shown in user-to-user collaboration score table $682_1$. Specifically, scores (e.g., in "score" column fields) and dot-product score components (e.g., in "dotProd" column fields) for the "uM-u1", "uM-u2", and other user-to-user pairs are shown.

According to the herein disclosed techniques, modifications to any of the user-to-object vectors can invoke a user-to-user collaboration score update. To facilitate the update, certain score components are retrieved from the available data (e.g., user-to-object vectors $482_3$ and user-to-user collaboration score table $682_1$). An example set of retrieved score components are shown in user "uM" score components $604_1$. As can be observed, the score components are derived from user-to-object vectors $482_3$ and user-to-user collaboration score table $682_1$. The score components can be organized in accordance with a cosine-similarity formula 602. For example, the "uM-u2" score components comprise a dot-product numerator of "2867" from user-to-user collaboration score table $682_1$ and a denominator that includes a "uM" vector length of "54" and a "u2" vector length of "64" from user-to-object vectors $482_3$. As shown, some of the score components (e.g., the "uM" vector length) in user "uM" score components $604_1$ have been updated in response to the user-to-object interaction event $114_3$. Other score components are updated in response to detecting the modification to the user-to-object vectors $482_3$. In this scenario, merely the "uM-u2" dot-product is affected by the detected modification and updated accordingly, as depicted in user "uM" score components $604_2$.

At some point, after all score components have been updated, the user-to-user collaboration score can be calculated and stored with selected score components, such as is illustrated in user-to-user collaboration score table $682_2$. As shown, user "uM" has a strong user-to-object interaction activity similarity with user "u2" (e.g., "score=0.82"), at least as compared to user "uM" and user "u1" similarity (e.g., "score=0.41"). At some point in time a collaboration between user "uM" and user "u2" might be recommended. Alternatively, a particular object might be recommended to a given user based at least in part on the aforementioned strong user-to-object interaction activity similarity.

The calculation of a user-to-user collaboration score can be deferred until it is needed. For example, calculation of a particular user-to-user collaboration score can be deferred until such time as one of the involved users is logged in and viewing a user interface that at least potentially relates to collaboration recommendations. In some cases, an upcoming need for calculation of certain user-to-user collaboration scores can be predicted, and calculation of certain user-to-user collaboration scores can be initiated. Strictly as one example, predictions can be made based on a login event for a particular user. As another example, if a particular user launches a user interface that pertains to collaboration activities (e.g., a user interface for managing collaboration groups, a user interface for sharing an object, etc.), then the event of launching that user interface can imply a user's interest in seeing collaboration recommendations, which implication in turn can serve to initiate calculation of a set of user-to-user collaboration scores that pertain to the particular user. As such, the calculation of user-to-user collaboration scores (e.g., using updated score components) can often be delayed for long periods of time (e.g., until such time as the particular user is deemed to have an interest in seeing collaboration recommendations).

Further details regarding general approaches to presenting user interfaces that pertain to collaboration activity are described in U.S. application Ser. No. 15/728,486 titled "COLLABORATION ACTIVITY SUMMARIES", filed on Oct. 9, 2017, which is hereby incorporated by reference in its entirety.

Figure 7:
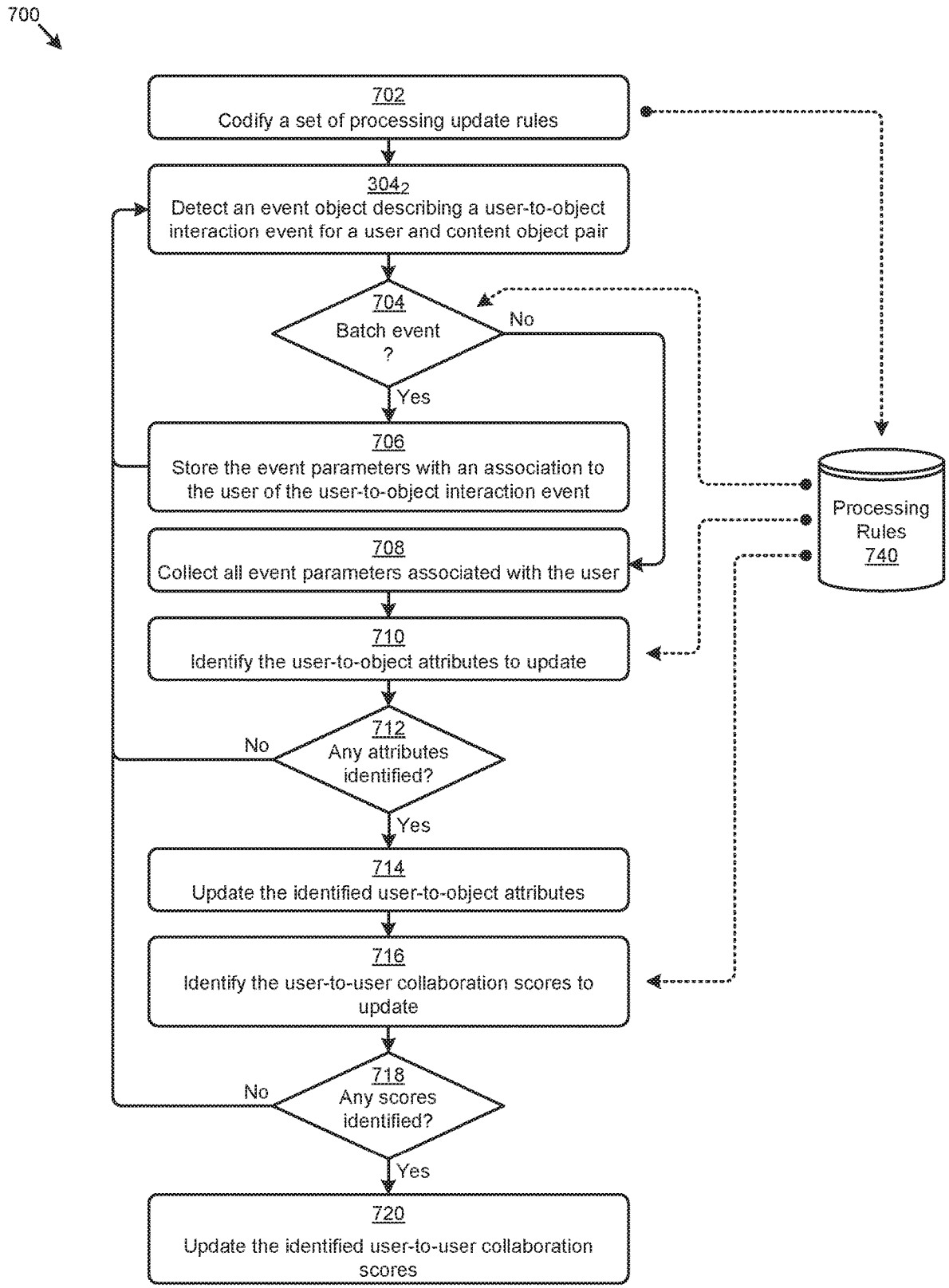
FIG. 7 depicts an event batching technique as implemented in systems that form collaboration recommendations based at least in part on the then-current events over shared content, according to an embodiment.

An embodiment of the herein disclosed techniques that implement a set of processing rules (e.g., batch processing rules) is presented and discussed as pertains to FIG. 7.

FIG. 7 depicts an event batching technique 700 as implemented in systems that form collaboration recommendations based at least in part on the then-current events over shared content. As an option, one or more variations of event batching technique 700 or any aspect thereof may be implemented in the context of the architecture and functionality of the embodiments described herein. The event batching technique 700 or any aspect thereof may be implemented in any environment.

The event batching technique 700 presents one embodiment of certain steps and/or operations that consult a set of processing rules 740 to manage incremental updates to certain data in systems that facilitate the formation of collaboration recommendations based at least in part on the then-current events over shared content. The incremental update processing can commence by codifying a set of processing rules (step 702). For example, the processing rules 740 can be invoked to determine whether or not to batch a particular event object. Such processing rules 740 can be established by a system administrator or by a code developer.

The event batching technique 700 further detects an event object that describes a user-to-object interaction event for a user and content object pair (step 3042). If the detected event object is to be batched for later processing (see "Yes" path of decision 704), then the event parameters from the event object are stored with an association to the user of user-to-object interaction event (step 706), and process returns to listen for more event objects. As illustrated, processing rules 740 can be consulted to determine whether or not to batch a particular event object. For example, the rules might invoke batch processing based at least in part on the frequency of events detected for a given user. If the detected event object is not batch processed (see "No" path of decision 704), then all event parameters associated with the user of the user-to-object interaction event are collected (step 708). In some cases, the event parameters of a single event object are collected, while in other cases, the event parameters from several earlier batched event objects are collected.

A set of user-to-object attributes to update are identified (step 710). Processing rules 740 can be accessed to identify the user-to-object attributes to update. For example, processing rules 740 might update the user-to-object interaction score but not update the vector length at every event pertaining to a comparatively active user. If no attributes are identified for update (see "No" path of decision 712), the process returns to listen for more event objects. If at least one attribute is identified for update (see "Yes" path of decision 712), the identified user-to-object attributes are updated (step 714).

The user-to-user collaboration scores to update (e.g., responsive to the user-to-object attribute updates) are then identified (step 716). Processing rules 740 can also be consulted to identify the user-to-user collaboration scores to update. For example, processing rules 740 might constrain an update to the user-to-user pairs that are in the highest quartile of the then-current user-to-user collaboration scores. If scores are identified for update (see "No" path of decision 718), the process returns to listen for more event objects. If at least one score is identified for update (see "Yes" path of decision 718), the identified user-to-user collaboration scores are updated (step 720).

Figure 8:
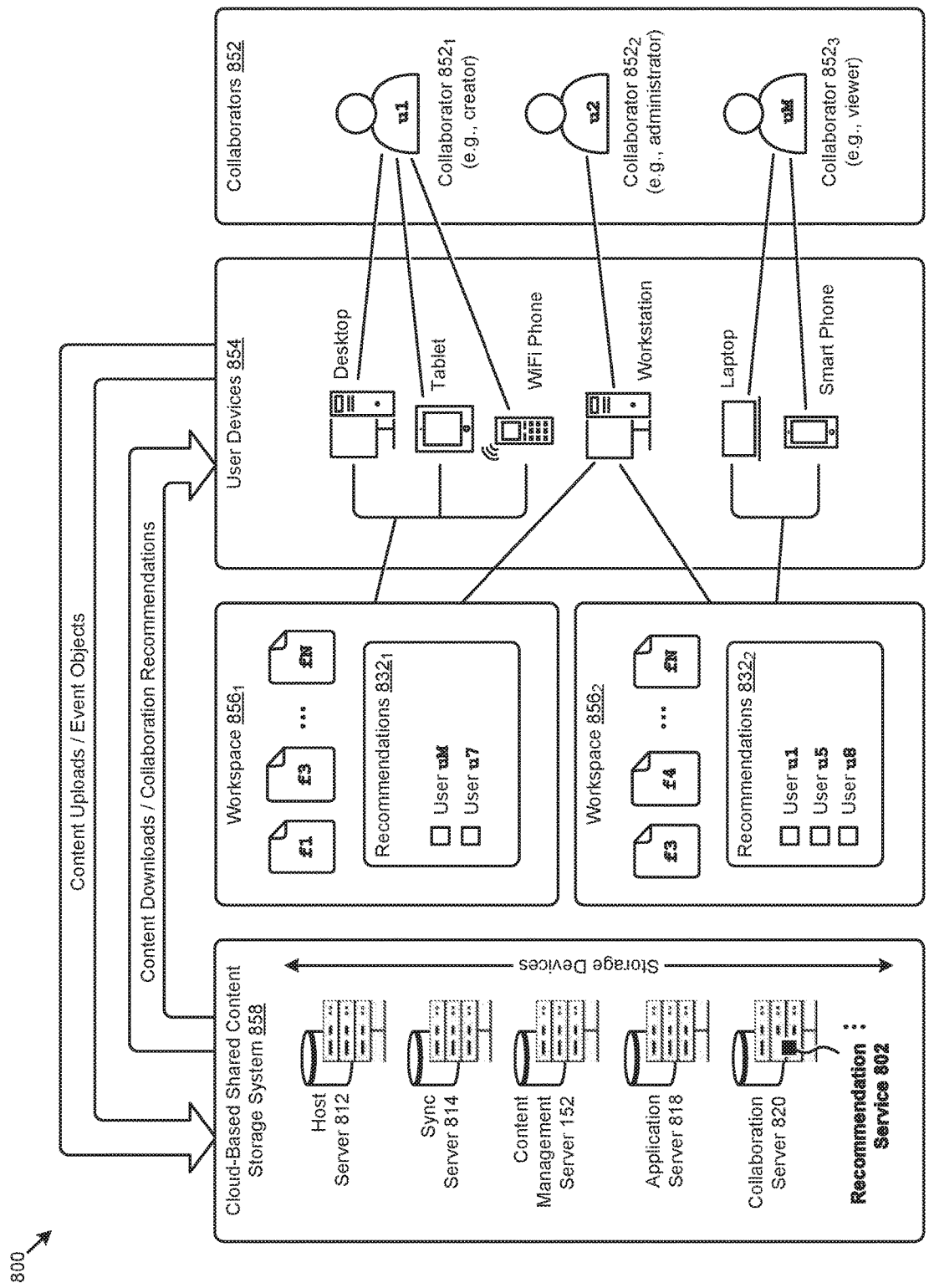
FIG. 8 depicts a cloud-based environment suitable for hosting components of systems that issue collaboration recommendations based at least in part on the then-current events over shared content, according to an embodiment.

Further details pertaining to implementing the herein disclosed techniques in a cloud-based environment are described and shown as pertaining to FIG. 8.

FIG. 8 depicts a cloud-based environment 800 suitable for hosting components of systems that issue collaboration recommendations based at least in part on the then-current events over shared content. As an option, one or more variations of cloud-based environment 800 or any aspect thereof may be implemented in the context of the architecture and functionality of the embodiments described herein. The cloud-based environment 800 or any aspect thereof may be implemented in any environment.

As shown in FIG. 8, certain users (e.g., collaborators 852) having various collaboration roles (e.g., creator, editor, administrator, approver, auditor, reviewer, etc.) can use one or more instances of user devices 854 to interact with one or more workspaces (e.g., workspace $856_1$, workspace $856_2$, etc.) facilitated by a cloud-based shared content storage system 858 in the cloud-based environment 800. As an example, collaborator $852_1$ might be a content creator (e.g., identified as user "u1") with access to workspace $856_1$, collaborator $852_3$ might be a content viewer (e.g., identified as user "uM") with access to workspace $856_2$, and collaborator $852_2$ might be an administrator (e.g., identified as user "u2") with access to both workspaces. The workspaces can be stored in any location, and are at least partially maintained by components within the cloud-based shared content storage system 858. The cloud-based shared content storage system 858 supports any variety of processing elements and/or servers, such as a host server 812, a sync server 814, a content management server 152, an application server 818, the collaboration server 820 comprising an instance of a recommendation service 802 (e.g., an instance of a collaboration recommendation service), and/or other processing elements. The cloud-based shared content storage system 858 further facilitates access by the foregoing processing elements to any variety of storage devices.

Any of the users can be provisioned for authorized access to various portions the content objects stored in the storage devices without requiring the additional process of manually downloading and storing a file locally on an instance of user devices 854 (e.g., a desktop computer, a tablet, a WiFi phone, a workstation, a laptop computer, a smart phone, etc.). For example, one of the content objects (e.g., file "f3") that was created and uploaded by collaborator $852_1$ might be viewed by another collaborator even though collaborator $852_1$ did not explicitly inform the other collaborator of the existence of file "f3". As shown, file "f3" is physically or logically stored in the storage devices of cloud-based shared content storage system 858, thus reducing or eliminating repetitive steps involved in repeated sharing processes and/or collaboration processes.

More specifically, the aforementioned workspaces can facilitate event-based collaborator recommendations. For example, collaborator $852_1$ (e.g., user "u1") might interact with file "f1", file "f3", and other files in workspace $856_1$, while collaborator $852_3$ (e.g., user "uM") might interact with file "f3", file "fN", and other files in workspace $856_2$. According to the herein disclosed techniques, such interactions can produce user-to-object interaction events described by event objects that are processed to issue various collaboration recommendations to the users. Specifically, and as shown, a set of object recommendations $832_1$ that comprise user "uM" and user "u7" are presented to user "u1" in workspace $856_1$, and a set of object recommendations $832_2$ that comprise user "u1", user "u5", and user "u8" are presented to user "uM" in workspace $856_2$. The user can acknowledge (e.g., using checkboxes or another type of screen device) any/all (or none) of the recommendations.

Figure 9:
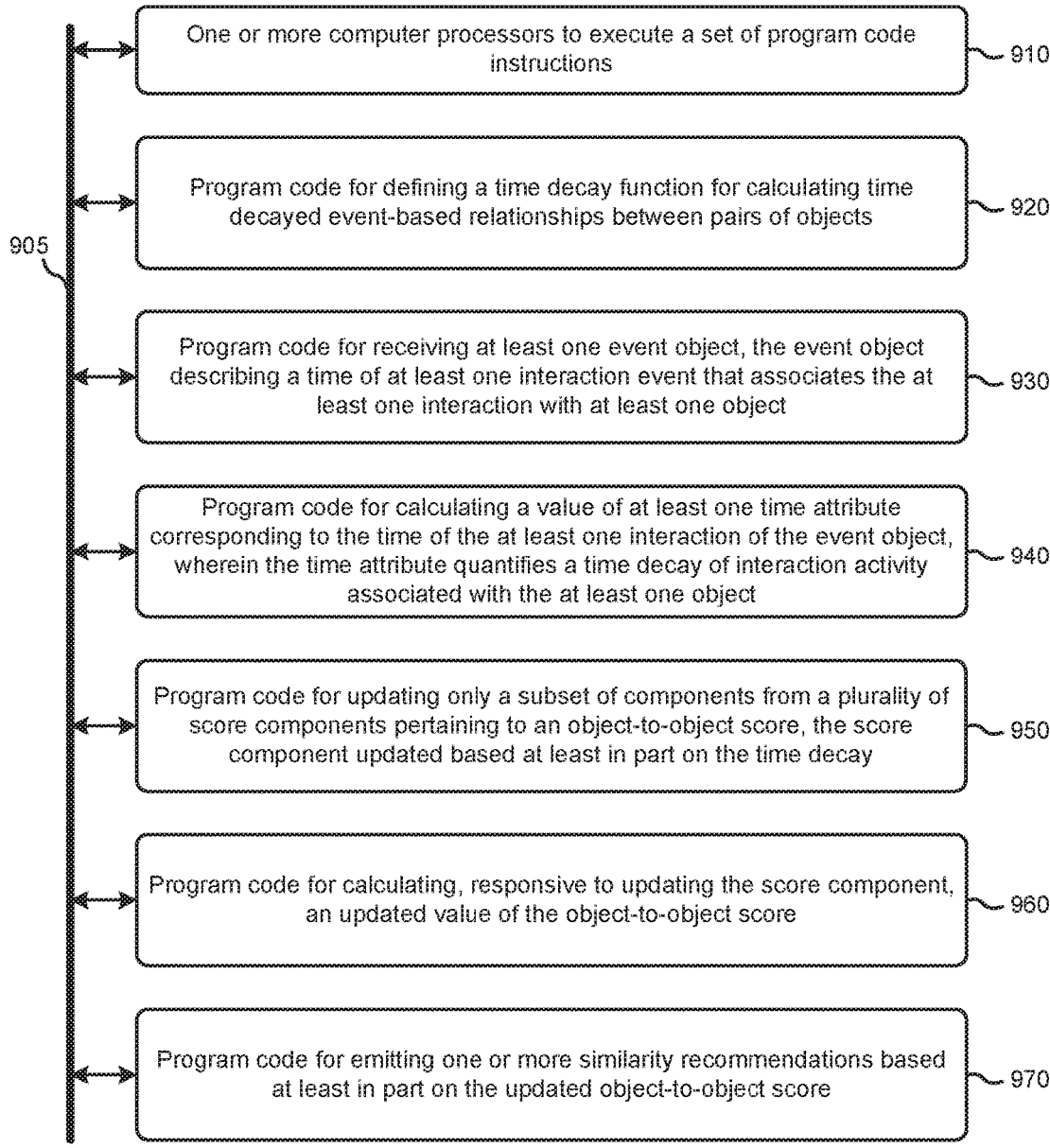
FIG. 9 depicts system components as arrangements of computing modules that are interconnected so as to implement certain of the herein-disclosed embodiments.

Additional Embodiments of the Disclosure
Additional Practical Application Examples FIG. 9 depicts a system 900 as an arrangement of computing modules that are interconnected so as to operate cooperatively to implement certain of the herein-disclosed embodiments. This and other embodiments present particular arrangements of elements that, individually and/or as combined, serve to form improved technological processes that address efficiently identifying collaboration candidates that are quantitatively determined to be relevant with respect to a series of then-current user-to-object interaction events. The partitioning of system 900 is merely illustrative and other partitions are possible. As an option, the system 900 may be implemented in the context of the architecture and functionality of the embodiments described herein. Of course, however, the system 900 or any operation therein may be carried out in any desired environment.

The system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with other operations over communication path 905. The modules of the system can, individually or in combination, perform method operations within system 900. Any operations performed within system 900 may be performed in any order unless as may be specified in the claims.

The shown embodiment implements a portion of a computer system, presented as system 900, comprising one or more computer processors to execute a set of program code instructions (module 910) and modules for accessing memory to hold program code instructions to perform: defining a time decay function (e.g., an exponentially declining time decay function) for calculating time decayed event-based relationships between pairs of objects (module 920); receiving at least one event object, the event object describing a time of at least one interaction event that associates the at least one interaction with at least one object (module 930); calculating a value of at least one time attribute corresponding to the time of the at least one interaction of the event object, wherein the time attribute quantifies a time decay of interaction activity associated with the at least one object (module 940); updating only a subset of components of a plurality of score components pertaining to an object-to-object score, the score component updated based at least in part on the time decay (module 950); calculating, responsive to updating the score component, an updated value of the object-to-object score (module 960); and emitting one or more similarity recommendations based at least in part on the updated object-to-object score (module 970).

Variations of the foregoing may include more or fewer of the shown modules. Certain variations may perform more or fewer (or different) steps, and/or certain variations may use data elements in more, or in fewer (or different) operations. Strictly as one example, a method embodiment for determining time-varying similarities between pairs of objects might carry out steps of (1) defining a time decay function for calculating time decayed event-based relationships between the pairs of objects; (2) receiving at least one event object, the event object describing a time of at least one interaction event that associates at least one interaction with at least one object; (3) calculating a value of at least one time attribute corresponding to the time of the at least one interaction of the event object, wherein the time attribute quantifies a time decay of interaction activity associated with the at least one object; (4) updating only a subset of components of a plurality of score components pertaining to an object-to-object score, the score component updated based at least in part on the time decay; (5) calculating, responsive to updating the score component, an updated value of the object-to-object score; and (6) emitting one or more similarity recommendations based at least in part on the updated object-to-object score.

Still further, some embodiments include variations in the operations performed, and some embodiments include variations of aspects of the data elements used in the operations.

System Architecture Overview

Additional System Architecture Examples

Figure 10A:
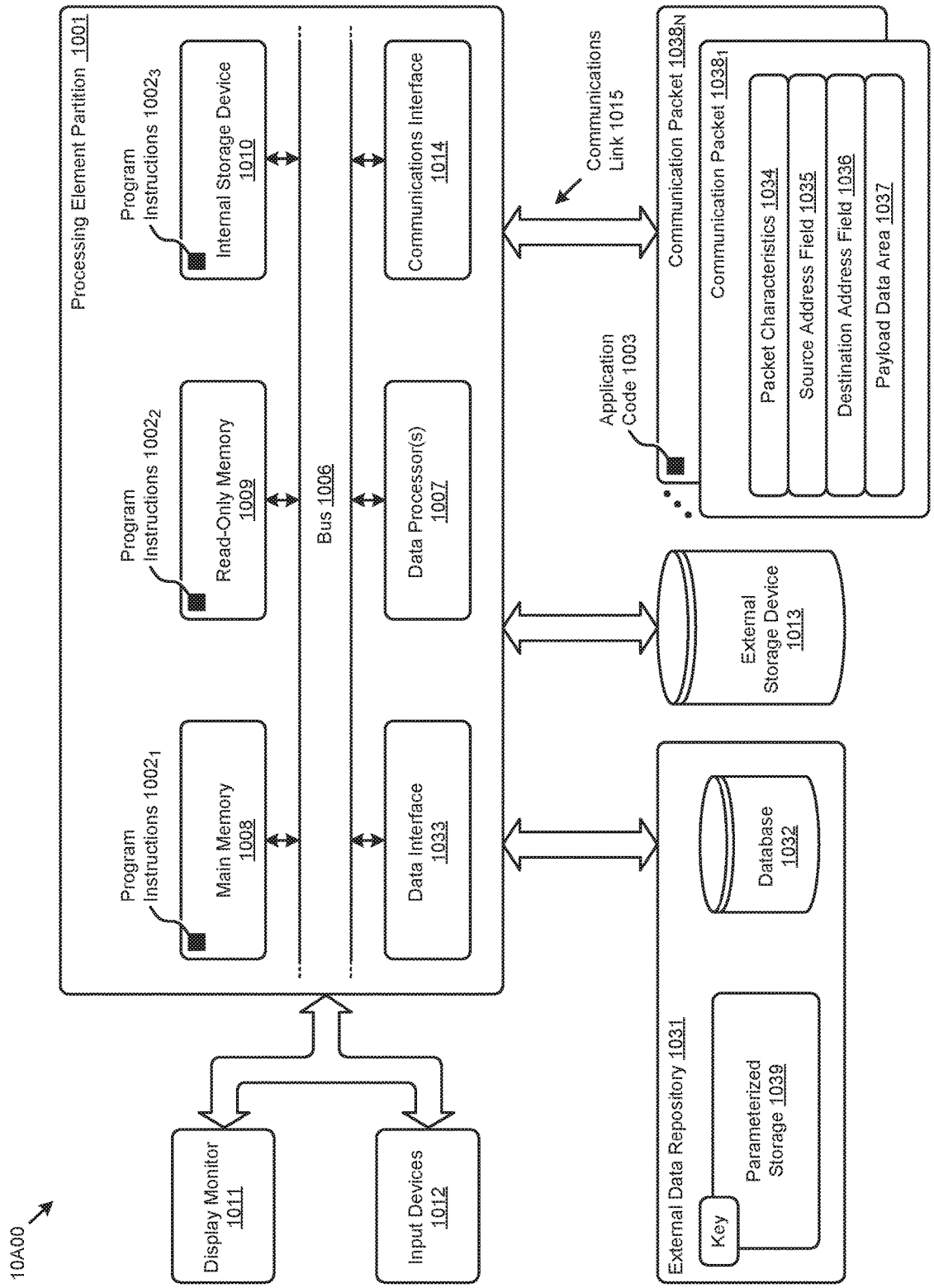
FIG. 10A and FIG. 10B present block diagrams of computer system architectures having components suitable for implementing embodiments of the present disclosure, and/or for use in the herein-described environments.

FIG. 10A depicts a block diagram of an instance of a computer system 10A00 suitable for implementing embodiments of the present disclosure. Computer system 10A00 includes a bus 1006 or other communication mechanism for communicating information. The bus interconnects subsystems and devices such as a central processing unit (CPU), or a multi-core CPU (e.g., data processor 1007), a system memory (e.g., main memory 1008, or an area of random access memory (RAM)), a non-volatile storage device or non-volatile storage area (e.g., read-only memory 1009), an internal storage device 1010 or external storage device 1013 (e.g., magnetic or optical), a data interface 1033, a communications interface 1014 (e.g., PHY, MAC, Ethernet interface, modem, etc.). The aforementioned components are shown within processing element partition 1001, however other partitions are possible. Computer system 10A00 further comprises a display 1011 (e.g., CRT or LCD), various input devices 1012 (e.g., keyboard, cursor control), and an external data repository 1031.

According to an embodiment of the disclosure, computer system 10A00 performs specific operations by data processor 1007 executing one or more sequences of one or more program code instructions contained in a memory. Such instructions (e.g., program instructions $1002_1$, program instructions $1002_2$, program instructions $1002_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 10A00 performs specific networking operations using one or more instances of communications interface 1014. Instances of communications interface 1014 may comprise one or more networking ports that are configurable (e.g., pertaining to speed, protocol, physical layer characteristics, media access characteristics, etc.) and any particular instance of communications interface 1014 or port thereto can be configured differently from any other particular instance. Portions of a communication protocol can be carried out in whole or in part by any instance of communications interface 1014, and data (e.g., packets, data structures, bit fields, etc.) can be positioned in storage locations within communications interface 1014, or within system memory, and such data can be accessed (e.g., using random access addressing, or using direct memory access DMA, etc.) by devices such as data processor 1007.

Communications link 1015 can be configured to transmit (e.g., send, receive, signal, etc.) any types of communications packets (e.g., communication packet $1038_1$, communication packet $1038_N$) comprising any organization of data items. The data items can comprise a payload data area 1037, a destination address 1036 (e.g., a destination IP address), a source address 1035 (e.g., a source IP address), and can include various encodings or formatting of bit fields to populate packet characteristics 1034. In some cases, the packet characteristics include a version identifier, a packet or payload length, a traffic class, a flow label, etc. In some cases, payload data area 1037 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1007 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1031, which in turn can be formatted into any one or more storage areas, and which can comprise parameterized storage 1039 accessible by a key (e.g., filename, table name, block address, offset address, etc.).

Execution of the sequences of instructions to practice certain embodiments of the disclosure are performed by a single instance of a computer system 10A00. According to certain embodiments of the disclosure, two or more instances of computer system 10A00 coupled by a communications link 1015 (e.g., LAN, public switched telephone network, or wireless network) may perform the sequence of instructions required to practice embodiments of the disclosure using two or more instances of components of computer system 10A00.

Computer system 10A00 may transmit and receive messages such as data and/or instructions organized into a data structure (e.g., communications packets). The data structure can include program instructions (e.g., application code 1003), communicated through communications link 1015 and communications interface 1014. Received program code may be executed by data processor 1007 as it is received and/or stored in the shown storage device or in or upon any other non-volatile storage for later execution. Computer system 10A00 may communicate through a data interface 1033 to a database 1032 on an external data repository 1031. Data items in a database can be accessed using a primary key (e.g., a relational database primary key).

Processing element partition 1001 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1007. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to emitting collaboration recommendations based at least in part on the then-current events over shared content. A module may include one or more state machines and/or combinational logic used to implement or facilitate the operational and/or performance characteristics pertaining to emitting collaboration recommendations based at least in part on a set of then-current events.

Various implementations of database 1032 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of emitting collaboration recommendations based at least in part on the then-current events over shared content). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to emitting collaboration recommendations based at least in part on the then-current events over shared content, and/or for improving the way data is manipulated when performing computerized operations pertaining to incrementally updating components of user-to-user collaboration scores responsive to the then-current user-to-object interaction events to facilitate real-time collaboration recommendations.

Figure 10B:
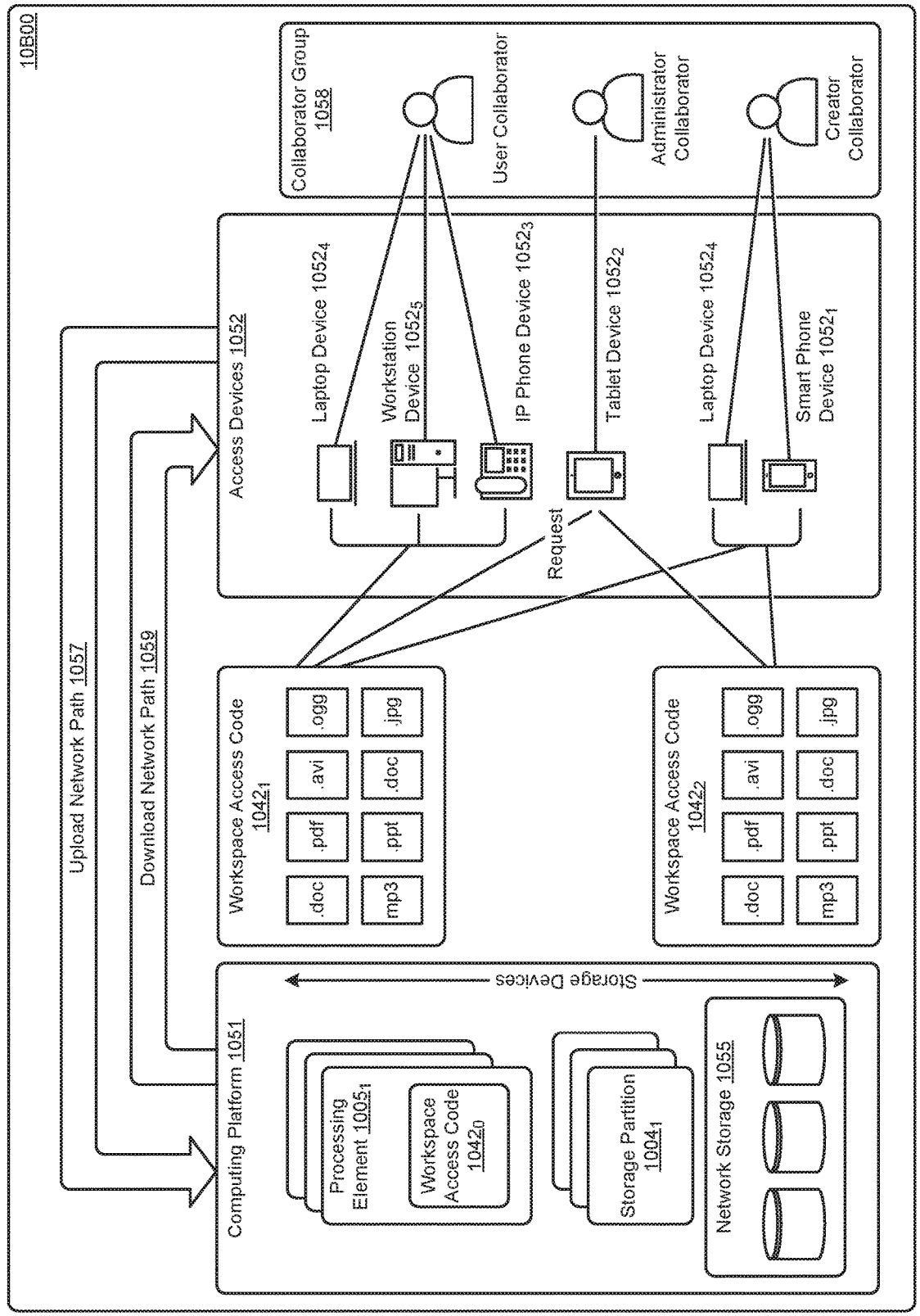

FIG. 10B depicts a block diagram of an instance of a cloud-based environment 10B00. Such a cloud-based environment supports access to workspaces through the execution of workspace access code (e.g., workspace access code $1042_0$, workspace access code $1042_1$, and workspace access code $1042_2$). Workspace access code can be executed on any of access devices 1052 (e.g., laptop device $1052_4$, workstation device $1052_5$, IP phone device $1052_3$, tablet device $1052_2$, smart phone device $1052_1$, etc.). A group of users can form a collaborator group 1058, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 1051, including in a middleware setting. As shown, a portion of the workspace access code resides in and can be executed on one or more processing elements (e.g., processing element $1005_1$). The workspace access code can interface with storage devices such as networked storage 1055. Storage of workspaces and/or any constituent files or objects, and/or any other code or scripts or data can be stored in any one or more storage partitions (e.g., storage partition $1004_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 1057). A stored workspace can be delivered to a particular user and/or shared with other particular users via a download (e.g., a download from a processing element to an access device over a download network path 1059).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for forming event-based collaboration recommendations, the method comprising:
    identifying a plurality of users that access a distributed computing and storage platform over a network, wherein the distributed computing and storage platform facilitates interactions between users and a plurality of content objects that are managed by the distributed computing and storage platform;
    receiving, at the distributed computing and storage platform comprising a computing device from a plurality of user devices, a data stream pertaining to a plurality of event objects, wherein an event object describes a user-to-object interaction by a user of the plurality of users with a content object of the plurality of content objects that are managed by the distributed computing and storage platform; and
    generating a collaboration recommendation for a first user of the plurality of users at least by performing, by the computing device and a communications link, a set of operations on a sequence of packets of the data stream, the set of operations comprising:
        determining, from the sequence of packets of the data stream, an interaction score that incorporates past user-to-object interactions up to a first time point for the first user at the first time point at least by decoding payload data from the sequence of packets, while storing only a smaller portion of the past user-to-object interactions up to the first time point data, rather than an entirety of the past user-to-object interactions up to the first time point in memory;
        upon detecting, at a second time point after the first time point, a new user-to-object interaction event from decoded payload data of the data stream, generating an updated user-to-object interaction event score at least by:
            adjusting the interaction score determined for the first time point into an adjusted event score for the second time point based at least in part upon a time-decayed value; and
            combining the adjusted event score with an incremental score, wherein the incremental score is determined for the new user-to-object interaction event based at least in part upon an interaction type assigned to the new user-to-object interaction event from multiple different interaction types; and
        generating the collaboration recommendation based at least in part upon the updated user-to-object interaction event score, wherein
            a plurality of weights that comprise multiple different weight values are respectively assigned to the multiple different interaction types,
            a first interaction type includes editing the content object, and a second interaction type includes viewing the content object,
            the adjusted event score is associated with a weight of the plurality of multiple weights assigned to the interaction type, and
            the collaboration recommendation identifies a second user.

2. The method of claim 1, further comprising:
    weighting at least one user-to-object attribute of the event object, the user-to-object attribute quantifying a user-to-object interaction activity associated with at least one user;
    decaying a previously-stored user-to-object interaction event score with a decay function to generate the time-decayed value; and
    generating the updated user-to-object interaction event score, the updated user-to-object interaction event score being generated based at least in part on the time-decayed value of the previously-stored user-to-object interaction event score.

3. The method of claim 2, wherein:
    decaying the previously-stored user-to-object interaction event score is performed by applying an exponentially declining time decay function to the previously-stored user-to-object interaction event score; and
    generating the updated user-to-object interaction event score is performed by updating at least one score component of a plurality of score components of the previously-stored user-to-object interaction event score to form at least one user-to-user collaboration score, wherein the at least one user-to-user collaboration score is generated in response to updating the at least one score component.

4. The method of claim 3, wherein the at least one user-to-user collaboration score is based at least in part on a cosine-similarity formula.

5. The method of claim 2, wherein adjusting the interaction score comprises:
    incrementally combining the adjusted event score with the incremental score, wherein
    the adjusted event score comprises a product of a decay function of the time-decayed value and the weight that is associated with the interaction type,
    the plurality of weights includes two or more different weight values, and
    generating the updated user-to-object interaction event score is performed using not more than two user-to-object interaction event scores.

6. The method of claim 2, wherein generating the updated user-to-object interaction event score is performed using exactly one then-current user-to-object interaction event score that incorporates the past user-to-object interactions up to the first time point and exactly one incremental user-to-object interaction event score, without storing the entirety of the past user-to-object interactions up to the first time point in the memory.

7. The method of claim 6, wherein the updated user-to-object interaction event score encapsulates information regarding the interaction score.

8. The method of claim 6, further comprising discarding the exactly one then-current user-to-object interaction event score after generating the updated user-to-object interaction event score, wherein a first weight of the plurality of weights is used to prevent a same collaboration recommendation from being repeatedly presented to the first user.

9. The method of claim 2, further comprising:
generating a separate collaboration recommendation that comprises a separate user different from the at least one user for the first user at least by performing a separate set of operations on the data stream by the distributed computing and storage platform based at least in part upon the interaction score and the past user-to-object interactions, wherein
the updated user-to-object interaction event score comprises a first score portion and a second score portion, the first score portion associated with the event object, and the second score portion associated with one or more earlier-detected event objects.

10. The method of claim 9, wherein the second score portion is a time-decayed version of a then-current user-to-object interaction event score, and a then-current user-to-object interaction event score established at a time prior to receiving the event object, the multiple different interaction types include an edit interaction type associated with a first weight and a view or preview interaction type associated with a second weight, and the first weight is higher than the second weight.

11. The method of claim 9, wherein a timestamp is embedded in the then-current or the updated user-to-object interaction event score.

12. The method of claim 9, wherein the updated user-to-object interaction event score is based at least in part on the weight associated with the interaction type corresponding to the new user-to-object interaction event.

13. The method of claim 1, further comprising: accessing a set of object-to-object affinities, wherein at least one of the set of object-to-object affinities describes at least one relationship between two objects.

14. The method of claim 13, wherein an object-to-object affinity score characterizes at least one of a date of creation affinity type indication or a date of modification affinity type indication.

15. The method of claim 14, wherein an affinity type indication comprises a corresponding affinity type weighting value that quantifies a magnitude of affinity between the two objects.

16. A computer readable medium embodied in a non-transitory computer readable medium, the non-transitory computer readable medium having stored thereon a sequence of instructions which, when executed by a processor causes a set of acts for forming event-based collaboration recommendations, the set of acts comprising:
identifying a plurality of users that access a distributed computing and storage platform over a network, wherein the distributed computing and storage platform facilitates interactions between users and a plurality of content objects that are managed by the distributed computing and storage platform;
receiving, at the distributed computing and storage platform comprising a computing device from a plurality of user devices, a data stream pertaining to a plurality of event objects, wherein an event object describes a user-to-object interaction by a user of the plurality of users with a content object of the plurality of content objects that are managed by the distributed computing and storage platform; and
generating a collaboration recommendation for a first user of the plurality of users at least by performing, by the computing device and a communications link, a set of operations on a sequence of packets of the data stream, the set of operations comprising:
determining, from the sequence of packets of the data stream, an interaction score that incorporates past user-to-object interactions up to a first time point for the first user at the first time point at least by decoding payload data from the sequence of packets, while storing only a smaller portion of the past user-to-object interactions up to the first time point, rather than an entirety of past user-to-object interactions up to the first time point in memory;
upon detecting, at a second time point after the first time point, a new user-to-object interaction event from decoded payload data of the data stream, generating an updated user-to-object interaction event score at least by:
adjusting the interaction score determined for the first time point into an adjusted event score for the second time point based at least in part upon a time-decayed value; and
combining the adjusted event score with an incremental score, wherein the incremental score is determined for the new user-to-object interaction event based at least in part upon an interaction type assigned to the new user-to-object interaction event from multiple different interaction types; and
generating the collaboration recommendation based at least in part upon the updated user-to-object interaction event score, wherein
a plurality of weights that comprise multiple different weight values are respectively assigned to the multiple different interaction types,
a first interaction type includes editing the content object, and a second interaction type includes viewing the content object,
the adjusted event score is associated with a weight of the plurality of multiple weights assigned to the interaction type, and
the collaboration recommendation identifies a second user.

17. The computer readable medium of claim 16, wherein the set of acts further comprise:
weighting at least one user-to-object attribute of the event object, the user-to-object attribute quantifying a user-to-object interaction activity associated with at least one user;
decaying a previously-stored user-to-object interaction event score with a decay function to generate the time-decayed value; and
generating the updated user-to-object interaction event score, the updated user-to-object interaction event score being generated based at least in part on the time-decayed value of the previously-stored user-to-object interaction event score.

18. The computer readable medium of claim 17, wherein:
decaying the previously-stored user-to-object interaction event score is performed by applying an exponentially declining time decay function to the previously-stored user-to-object interaction event score; and generating the updated user-to-object interaction event score is performed by updating at least one score component of a plurality of score components of the previously-stored user-to-object interaction event score to form at least one user-to-user collaboration score, wherein the at least one user-to-user collaboration score is generated in response to updating the at least one score component.

19. A system for forming event-based collaboration recommendations, the system comprising a distributed computing and storage platform that further comprises:

a communication link;

a non-transitory storage medium having stored thereon a sequence of instructions; and one or more processors that execute the sequence of instructions, wherein execution of the sequence of instructions by the one or more processors causes the one or more processors to perform a set of acts, the set of acts comprising:

identifying a plurality of users that access a distributed computing and storage platform over a network, wherein the distributed computing and storage platform facilitates interactions between users and a plurality of content objects that are managed by the distributed computing and storage platform;

receiving, at the distributed computing and storage platform comprising a computing device from a plurality of user devices, a data stream pertaining to a plurality of event objects, wherein an event object describes a user-to-object interaction by a user of the plurality of users with a content object of the plurality of content objects that are managed by the distributed computing and storage platform; and generating a collaboration recommendation for a first user of the plurality of users at least by performing, by the computing device and a communications link, a set of decoding operations on a sequence of packets of the data stream, the set of operations comprising:

determining, from the sequence of packets of the data stream, an interaction score that incorporates past user-to-object interactions up to a first time point for the first user at the first time point at least by decoding payload data from the sequence of packets, while storing only a smaller portion of the past user-to-object interactions up to the first time point, rather than an entirety of the past user-to-object interactions up to the first time point in memory;

upon detecting, at a second time point after the first time point, a new user-to-object interaction event from decoded payload data of the data stream, generating an updated user-to-object interaction event score at least by:

adjusting the interaction score determined for the first time point into an adjusted event score for the second time point based at least in part upon a time-decayed value; and combining the adjusted event score with an incremental score, wherein the incremental score is determined for the new user-to-object interaction event based at least in part upon an interaction type assigned to the new user-to-object interaction event from multiple different interaction types; and generating the collaboration recommendation based at least in part upon the updated user-to-object interaction event score, wherein a plurality of weights that comprise multiple different weight values are respectively assigned to the multiple different interaction types, a first interaction type includes editing the content object, and a second interaction type includes viewing the content object, the adjusted event score is associated with a weight of the plurality of multiple weights assigned to the interaction type, and the collaboration recommendation identifies a second user.

20. The system of claim 19, wherein the set of acts further comprise:

weighting at least one user-to-object attribute of the event object, the user-to-object attribute quantifying a user-to-object interaction activity associated with at least one user;

decaying a previously-stored user-to-object interaction event score with a decay function to generate the time-decayed value; and generating the updated user-to-object interaction event score, the updated user-to-object interaction event score being generated based at least in part on the time-decayed value of the previously-stored user-to-object interaction event score.

* * * * *